United States Patent
Yasuda

(10) Patent No.: US 9,134,752 B2
(45) Date of Patent: Sep. 15, 2015

(54) TIME MEASUREMENT DEVICE, MICRO-CONTROLLER AND METHOD OF MEASURING TIME

(71) Applicant: LAPIS SEMICONDUCTOR CO., LTD., Hachioji-shi, Tokyo (JP)

(72) Inventor: Kosuke Yasuda, Tokyo (JP)

(73) Assignee: LAPIS SEMICONDUCTOR CO., LTD., Yokohama (JP)

( * ) Notice: Subject to any disclaimer, the term of this patent is extended or adjusted under 35 U.S.C. 154(b) by 365 days.

(21) Appl. No.: 13/687,121

(22) Filed: Nov. 28, 2012

(65) Prior Publication Data

US 2013/0145198 A1 Jun. 6, 2013

(30) Foreign Application Priority Data

Dec. 1, 2011 (JP) .................................. 2011-263991

(51) Int. Cl.
*G06F 1/14* (2006.01)
*G06F 1/04* (2006.01)

(52) U.S. Cl.
CPC ... *G06F 1/14* (2013.01); *G06F 1/04* (2013.01)

(58) Field of Classification Search
CPC ..................................... G06F 1/14; G06F 1/04
See application file for complete search history.

(56) References Cited

U.S. PATENT DOCUMENTS

| | | | | |
|---|---|---|---|---|
| 5,379,390 A | * | 1/1995 | Searing et al. | 702/75 |
| 6,084,441 A | * | 7/2000 | Kawai | 327/99 |
| 6,665,809 B1 | * | 12/2003 | Goldrian et al. | 713/503 |
| 2006/0223454 A1 | * | 10/2006 | Westwick et al. | 455/76 |
| 2012/0250469 A1 | * | 10/2012 | White et al. | 368/160 |
| 2014/0169414 A1 | * | 6/2014 | Moen | 375/218 |

FOREIGN PATENT DOCUMENTS

| | | |
|---|---|---|
| JP | 05-048433 A | 2/1993 |
| JP | 08-139593 A | 5/1996 |
| JP | 10-049251 A | 2/1998 |
| JP | 2006-309479 A | 11/2006 |

* cited by examiner

*Primary Examiner* — Jaweed A Abbaszadeh
*Assistant Examiner* — Cheri Harrington
(74) *Attorney, Agent, or Firm* — Kubotera & Associates, LLC

(57) ABSTRACT

A time measurement device includes a first measurement unit configured to measure a clock number of a first reference clock signal within a specific cycle of a second reference clock signal; a calculation unit configured to calculate a physical amount indicating a variance amount of the clock number relative to a reference clock number; a compensation unit configured to compensate an expected measurement value indicating the clock number of the first reference clock signal corresponding to a time as a measurement target according to the physical amount calculated with the calculation unit; and an output unit configured to output time information indicating that the clock number of the first reference clock signal reaches the expected measurement value when the clock number of the first reference clock signal measured with the first measurement unit reaches the expected measurement value compensated with the compensation unit.

16 Claims, 15 Drawing Sheets

TIME MEASUREMENT DEVICE, MICRO-CONTROLLER AND METHOD OF MEASURING TIME

BACKGROUND OF THE INVENTION AND RELATED ART STATEMENT

The present invention relates to a time measurement technique using a timer in a device performing a computer process. More specifically, the present invention relates to a time measurement device, a micro-controller, and a method of measuring a time capable of performing a time measurement operation with high accuracy at a low cost especially at a high speed operation.

In general, as a device performing a computer process, a conventional micro-controller has been known, in which an entire computer system is integrated on one single semiconductor chip. The conventional micro-controller may be provided with a plurality of oscillators constituting an operation clock. Accordingly, it is possible to switch the operation clock for a CPU (Central Processing Unit) or a peripheral circuit of a timer according to a usage or a purpose of the computer process.

For example, in the conventional micro-controller, a low speed clock is selected as the operation clock in a normal operation for conserving power consumption. When it is necessary to operate at a high speed, the operation clock is switched to a high speed clock.

As an example, in a conventional system for performing wireless communication, it is configured that until reception of a command through wireless transmission is started, the conventional system is operated with a low speed clock to become an idle state for waiting for the command. Accordingly, it is possible to reduce power consumption during the idle state for waiting for the command.

It is supposed that the conventional system for performing the wireless communication may include a first device and a second device. The first device may be configured such that a state thereof is continuously changed in a specific interval, and the state of the first device is transmitted through the wireless transmission. The second device may be configured to receive the state of the first device so that the second device changes an operation thereof in the same interval according to the state of the first device. With such a configuration, even when the wireless transmission from the first device is interrupted due to interference, it is possible to continuously perform the operation of the second device according to the interval received previously.

In the conventional system for performing the wireless communication described above, in order for the second device to synchronize with the first device even when the wireless transmission from the first device is interrupted, it is necessary to accurately measure the time interval of the command thus received. Accordingly, it is necessary to provide a timer with high accuracy for measuring the time interval of the command.

In general, the timer disposed in the conventional micro-controller includes the oscillator such as a crystal oscillator and an RC oscillator. The crystal oscillator is provided with a crystal oscillation element as an external part, and is capable of generating a clock with high accuracy.

In the RC oscillator, it is not necessary to provide the external part to the conventional micro-controller, and it is possible to integrate inside the conventional micro-controller. Accordingly, it is possible to produce the RC oscillator at a relatively low cost as compared with the crystal oscillator. However, in the RC oscillator, it is difficult to generate a clock with high accuracy as compared with the crystal oscillator. Accordingly, it is difficult to apply the RC oscillator to an application in which it is necessary to measure the time accurately.

In order to solve the problem described above, Patent Reference 1 has disclosed such a conventional technique capable of measuring the time accurately even when the timer is formed of the RC oscillator. FIG. 15 is a time chart showing an operation of the conventional micro-controller disclosed in Patent Reference 1.

Patent Reference 1: Japanese Patent Publication No. 10-49251

In the conventional micro-controller disclosed in Patent Reference 1, the RC oscillator and the crystal oscillator are configured to generate reference clocks. Further, an interruption request register is provided for generating an interruption request signal.

As shown in FIG. 15, the interruption request signal of the interruption request register is raised at a rise of the reference clock of the RC oscillator. From the rise of the interruption request signal, it is configured to detect a start of one cycle of the reference clock (indicated with "A" in FIG. 15) of the RC oscillator and an end of one cycle of the reference clock (indicated with "B" in FIG. 15) of the RC oscillator. During the one cycle of the reference clock of the RC oscillator, a count value (a measurement value) of the reference clock of the crystal oscillator that possesses high accuracy and a high frequency is measured.

As described above, with the crystal oscillator that possesses high accuracy and a high frequency, one cycle of the reference clock of the RC oscillator is measured, so that the actual cycle of the RC oscillator can be accurately measured. In the next step, it is configured to calculate a ratio of the actual cycle thus measured to a cycle (an expected measurement value) of the RC oscillator in a normal operation, so that a compensation coefficient is determined according to the ratio thus calculated. At last, the compensation coefficient is multiplied by the measurement value of the timer to which the RC oscillator is input.

In the conventional micro-controller disclosed in Patent Reference 1, however, there are the following problems.

As for the first problem, in the conventional technique disclosed in Patent Reference 1, it is necessary to provide the crystal oscillator capable of directly measuring the clock cycle of the RC oscillator. The crystal oscillator with a high frequency tends to be expensive. Accordingly, even though the RC oscillator is used, it is difficult to reduce a cost.

In general, when the crystal oscillator has a higher frequency, the cost thereof tends to increase. Accordingly, when a computer system is provided with the crystal oscillator with a high frequency for controlling a time, the cost of the computer system is increased as well.

In order for the conventional micro-controller to operate at a high speed and a low cost, it is desirable to increase the clock of the RC oscillator as the system clock. However, in this case, according to the conventional technique disclosed in Patent Reference 1, it is necessary to provide the crystal oscillator with the high frequency.

It is noted that in the conventional micro-controller disclosed in Patent Reference 1, the clock of the crystal oscillator is used as the system clock for the high speed operation. However, in order for the conventional micro-controller to operate at a higher speed, it is necessary to provide the crystal oscillator with the higher frequency, thereby increasing the cost.

As for the second problem, in the conventional technique disclosed in Patent Reference 1, in order to determine the compensation coefficient accurately, the RC oscillator must have a frequency lower than that of the crystal oscillator. Accordingly, it is difficult to increase a resolution of the timer to which the reference clock of the RC oscillator with a low frequency is input.

In order to increase the resolution of the timer, it is necessary to use the RC oscillator capable of oscillating the reference clock at a high frequency. It is possible to increase the frequency of the RC oscillator at a relatively low cost. However, in the conventional micro-controller disclosed in Patent Reference 1, in order to increase the resolution of the timer, it is necessary to provide the crystal oscillator with the higher frequency, thereby increasing the cost.

It should be noted that as Patent Reference 1 has disclosed, when the frequency of the RC oscillator is divided, it is possible to increase the resolution of the timer with the crystal oscillator having a low frequency. However, in this case, it is necessary to provide a frequency dividing unit. Patent Reference 2 has disclosed such a frequency dividing unit.

Patent Reference 2: Japanese Patent Publication No. 05-48433

When the frequency dividing unit is provided, one cycle of the reference clock of the RC oscillator is divided and extended. Accordingly, when the compensation coefficient is determined, it takes a long time to measure the clock of the crystal oscillator generated during one cycle of the reference clock of the RC oscillator.

As for the third problem, in the conventional technique disclosed in Patent Reference 1, when the compensation coefficient is determined, the start point and the end point of the clock of the crystal oscillator are detected through polling. Further, the compensation coefficient is used for outputting through a port through the polling. Accordingly, in the conventional micro-controller disclosed in Patent Reference 1, the CPU is operated all the time, so that it is difficult to switch the CPU to a power save mode. Further, during the polling, it is difficult for the CPU to perform other process.

As for the fourth problem, in the conventional technique disclosed in Patent Reference 1, when the compensation coefficient is determined, one cycle of the reference clock of the RC oscillator with the low frequency is measured by the timer to which the clock of the crystal oscillator with the high frequency. Accordingly, when a difference in the speeds between the RC oscillator and the crystal oscillator is increased, the measurement value of the timer tends to be overflowed.

Patent References 3 and 4 have disclosed a conventional technique for controlling the measurement operation of the clock of the oscillator by the timer.

Patent Reference 3: Japanese Patent Publication No. 2006-309479

Patent Reference 4: Japanese Patent Publication No. 08-139593

In the conventional technique disclosed in Patent Reference 3, in order to compensate an error in a frequency of a first clock signal, a second clock signal having a lower frequency than that of the first clock signal is input. In the next step, a pulse number of the first clock signal contained in one cycle of the second clock signal is measured with a pulse number counter.

In the next step, a calculation unit calculates compensation information using the pulse number measured with the pulse number counter and a reference pulse number determined in advance. In the next step, a compensation signal output unit outputs a clock compensation signal according to the compensation information calculated with the calculation unit. At last, an output of the first clock signal is compensated at an output gate according to the clock compensation signal output from the compensation signal output unit.

In the conventional technique disclosed in Patent Reference 3, however, the first clock signal generated with the RC oscillator and to be input into the timer is partially cut-off according to one cycle of the second clock signal generated with the crystal oscillator, so that a part of the first clock signal is not transmitted to the timer. Accordingly, it is necessary to modify the timer, thereby increasing the number of components in the configuration.

In the conventional technique disclosed in Patent Reference 4, the frequency of the RC oscillator is measured per one cycle of the reference oscillator. When the measurement value exceeds a specific value, the number of switch transistors is increased, so that the total capacity of the RC oscillator is increased and the output oscillation frequency is decreased. When the measurement value is below a specific value, the number of the switch transistors is decreased, so that the total capacity of the RC oscillator is decreased and the output oscillation frequency is increased.

In the conventional technique disclosed in Patent Reference 4, the process described above is repeated, so that the oscillation frequency is automatically controlled and stabilized at a target value with a separate internal reference oscillator. However, similar to the conventional technique disclosed in Patent Reference 3, it is necessary to increase the number of the switch transistors to modify the clock, thereby increasing the number of the components in the configuration.

In view of the problems described above, an object of the present invention is to provide a time measurement device, a micro-controller, and a method of measuring a time. In the present invention, it is possible to perform a time measurement operation with high accuracy and a low cost especially when a high speed operation is performed with a timer disposed in a computer device.

Further objects and advantages of the invention will be apparent from the following description of the invention.

SUMMARY OF THE INVENTION

In order to attain the objects described above, according to a first aspect of the present invention, a time measurement device includes a measurement unit; a calculation unit; a compensation unit; and an output unit.

According to the first aspect of the present invention, in the time measurement device, the measurement unit is configured to measure a clock number of a first reference clock signal within a specific cycle of a second reference clock signal having an oscillation frequency lower than that of the first reference clock signal and oscillation accuracy higher than that of the first reference clock signal. The calculation unit is configured to calculate a physical amount indicating a variance amount of the clock number measured with the measurement unit relative to a reference clock number measured in advance as the clock number of the first reference clock signal within the specific cycle of the second reference clock signal.

According to the first aspect of the present invention, in the time measurement device, the compensation unit is configured to compensate an expected measurement value indicating the clock number of the first reference clock signal corresponding to a time as a measurement target according to the physical amount calculated with the calculation unit. The output unit is configured to output time information indicating that the clock number of the first reference clock signal reaches the expected measurement value thus compensated when the clock number of the first reference clock signal measured with the measurement unit reaches the expected measurement value compensated with the compensation unit.

According to a second aspect of the present invention, a method is used for measuring a time with a computer device according to a program.

According to the second aspect of the present invention, the method of measuring the time includes a measurement step of measuring a clock number of a first reference clock signal within a specific cycle of a second reference clock signal having an oscillation frequency lower than that of the first reference clock signal and oscillation accuracy higher than that of the first reference clock signal. Further, the method of measuring the time includes a calculation step of calculating a physical amount indicating a variance amount of the clock number measured in the measurement step relative to a reference clock number measured in advance as the clock number of the first reference clock signal within the specific cycle of the second reference clock signal.

According to the second aspect of the present invention, the method of measuring the time further includes a compensation step of compensating an expected measurement value indicating the clock number of the first reference clock signal corresponding to a time as a measurement target according to the physical amount calculated in the calculation step. Further, the method of measuring the time includes an output step of outputting time information indicating that the clock number of the first reference clock signal reaches the expected measurement value when the clock number of the first reference clock signal measured in the measurement step reaches the expected measurement value compensated in the compensation step.

In the present invention, it is possible to perform the time measurement operation with high accuracy and a low cost especially when a high speed operation is performed with the timer disposed in the computer device.

DETAILED DESCRIPTION OF PREFERRED EMBODIMENTS

Hereunder, preferred embodiments of the present invention will be explained with reference to the accompanying drawings.

First Embodiment

Figure 1:
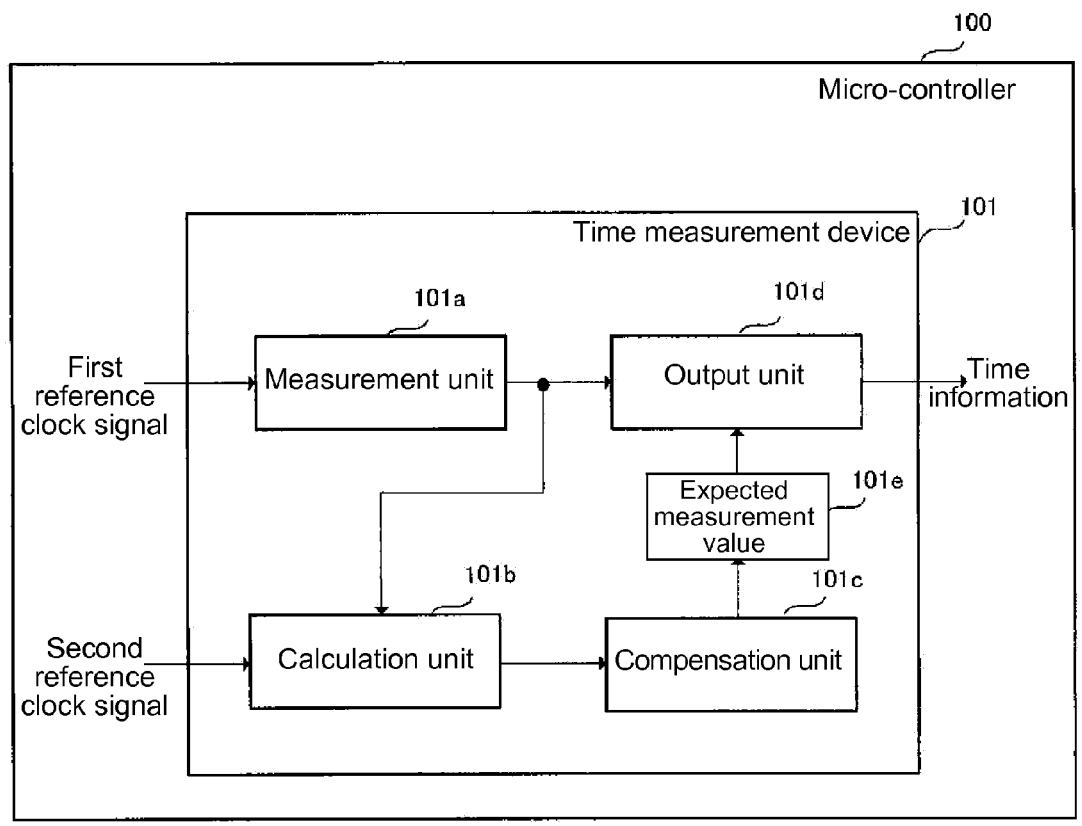
FIG. 1 is a block diagram showing an example of a functional configuration of a time measurement device disposed in a micro-controller according to a first embodiment of the present invention.

A first embodiment of the present invention will be explained. FIG. 1 is a block diagram showing an example of a functional configuration of a time measurement device 101 disposed in a micro-controller 100 according to the first embodiment of the present invention.

As shown in FIG. 1, the time measurement device 101 includes a measurement unit 101a; a calculation unit 101b; a compensation unit 101c; and an output unit 101d as functional units for performing an operation thereof.

In the embodiment, the measurement unit 101a is configured to measure a clock number of a first reference clock signal within a specific cycle of a second reference clock signal having an oscillation frequency lower than that of the first reference clock signal and oscillation accuracy higher than that of the first reference clock signal. The calculation unit 101b is configured to calculate a physical amount indicating a variance amount of the clock number measured with the measurement unit 101a relative to a reference clock number measured in advance as the clock number of the first reference clock signal within the specific cycle of the second reference clock signal.

In the embodiment, the compensation unit 101c is configured to compensate an expected measurement value 101e indicating the clock number of the first reference clock signal corresponding to a time as a measurement target according to the physical amount calculated with the calculation unit 101b. The output unit 101d is configured to output time information indicating that the clock number of the first reference clock signal reaches the expected measurement value 101e when the clock number of the first reference clock signal measured with the measurement unit 101a reaches the expected measurement value 101e compensated with the compensation unit 101c.

As described above, the micro-controller 100 includes the time measurement device 101, and the time measurement device 101 includes the measurement unit 101a, the calculation unit 101b, the compensation unit 101c, and the output unit 101d. Accordingly, it is possible to perform the time measurement operation with high accuracy at a low cost through a timer function especially when a high speed operation is performed.

Figure 2:
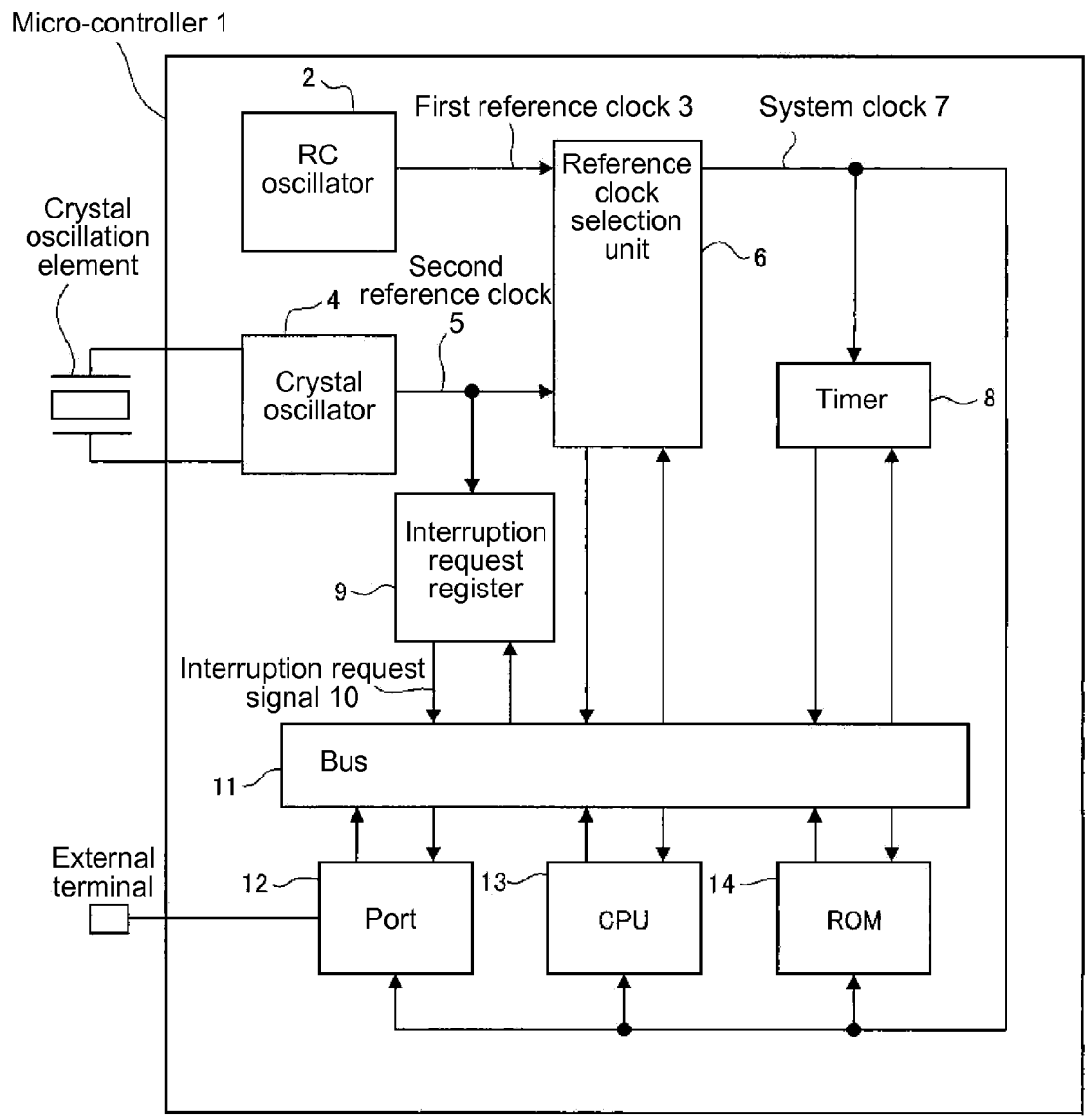
FIG. 2 is a block diagram showing an example of a configuration of the micro-controller provided with the time measurement device according to the first embodiment of the present invention.

The micro-controller 100 having the time measurement device 101 will be explained in more detail with reference to FIGS. 2 to 6. FIG. 2 is a block diagram showing an example of a configuration of a micro-controller 1 provided with the time measurement device 101 according to the first embodiment of the present invention.

As shown in FIG. 2, the micro-controller 1 includes an ROM (Read Only Memory) 14 for storing a program for controlling a process operation of the micro-controller 1; a CPU (Central Processing Unit) 13 for reading the program stored in the ROM 14 and executing a computer processing; a bus 11 for passing data inside the micro-controller 1; a port 12 for functioning as an interface relative to an external device.

Further, the micro-controller 1 includes an RC oscillator 2 for generating the first reference clock 3; a crystal oscillator 4 for generating the second reference clock 5; a reference clock selection unit 6 for selecting one of the first reference clock 3 and the second reference clock 5 to be output as a system clock 7; a timer 8 for measuring the system clock 7 as the time information; and an interruption request register 9 for outputting an interruption request signal 10 while synchronizing with the second reference clock 5.

In the embodiment, the CPU (Central Processing Unit) 13 is configured to read the program stored in the ROM 14, so that the CPU 13 executes the program. Accordingly, the CPU 13 constitutes functional units including the calculation unit 101b, the compensation unit 101c, and the output unit 101d. Further, the timer 8 corresponds to the measurement unit 101a, and the interruption request register 9 corresponds to a synchronization signal generating unit.

In the micro-controller 1 in the embodiment, the RC oscillator 2 is configured to generate the first reference clock 3 having a high oscillation frequency, and the crystal oscillator 4 is configured to generate the second reference clock 5 having an oscillation frequency lower than that of the first reference clock signal 3 and oscillation accuracy higher than that of the RC oscillator 2. Further, the reference clock selection unit 6 is configured to select one of the first reference clock 3 and the second reference clock 5 to be the system clock 7. The timer 8 is configured to measure the clock number of one of the first reference clock 3 and the second reference clock 5 as the system clock 7. The CPU 13 is configured to repeat confirming the measurement value of the timer 8 until the measurement value reaches a value (the expected measurement value 101e) corresponding to a predetermined time.

In the embodiment, the micro-controller 1 performs the high speed processing operation using the first reference clock 3 with the high oscillation frequency from the RC oscillator 2 as the system clock 7. Further, the micro-controller 1 performs the low speed processing operation using the second reference clock 5 with the low oscillation frequency from the crystal oscillator 4 as the system clock 7.

As described above, in the embodiment, the micro-controller 1 uses the first reference clock 3 with the high oscillation frequency from the RC oscillator 2 as the system clock 7. Accordingly, it is possible to perform the high speed processing operation at a low cost. However, it is difficult for the RC oscillator 2 to generate the clock signal with high accuracy as compared to the crystal oscillator 4. Accordingly, it is difficult to accurately measure a time due to an error in the time measurement operation of the timer 8 in the high speed processing operation.

In order to solve the problem, in the micro-controller 1 in the embodiment, the CPU 13 is configured to retrieve and execute a time measurement program stored in the ROM 14, so that the error generated in the time measurement operation of the timer 8 is compensated when the high speed processing operation is performed using the first reference clock 3 with the high oscillation frequency from the RC oscillator 2 as the system clock 7.

More specifically, the CPU 13 retrieves and executes the time measurement program stored in the ROM 14, thereby realizing the time measurement function. Accordingly, when the timer 8 measures the clock number of the first reference clock 3 from the RC oscillator 2 in the high speed processing operation, and the clock number reaches the expected measurement value 101e determined in advance, the time information correlating to the time information is output. In other words, before the CPU 13 starts retrieving the clock number of the first reference clock 3, the CPU 13 executes the program stored in the ROM 14 to realize the calculation unit 101b, the compensation unit 101c, and the output unit 101d. Accordingly, the error generated in the time measurement operation of the timer 8 due to the oscillation operation error of the RC oscillator 2 is compensated through the following process.

In the embodiment, first, the CPU 13 realizes the calculation unit 101b, so that the CPU 13 determines whether the second reference clock 5 with high oscillation accuracy from the crystal oscillator 4 is input. In the next step, when the CPU 13 determines that the second reference clock 5 is input, the CPU 13 retrieves the clock number of the first reference clock 3 measured with the timer 8 within one cycle of the second reference clock 5. Then, the CPU 13 calculates the physical amount indicating the variance amount of the clock number thus actually measured relative to the clock number of the first reference clock 3 (the reference clock number) measured in advance within the one cycle of the second reference clock signal 5. In the next step, the CPU 13 realizes the compensation unit 101c, so that the expected measurement value 101e is compensated according to the physical amount calculated with the calculation unit 101b.

In the embodiment, as the physical amount indicating the variance amount, the CPU 13 calculates a ratio of the clock number thus actually measured relative to the reference clock number. Accordingly, the expected measurement value 101e is compensated according to the ratio.

In the next step, the CPU 13 realizes the output unit 101d, so that the time information is output when the clock number of the first reference clock 3 measured with the timer 8 becomes the time measurement device 101e compensated with the compensation unit 101c.

As described above, in the micro-controller 1 in the embodiment, when the timer 8 measures the time during the high speed processing operation according to the first reference clock 3 with the high oscillation frequency from the RC oscillator 2, the second reference clock 5 with the low oscillation frequency input from the crystal oscillator 4 with the high oscillation accuracy is used as the control signal. Accordingly, the compensation is performed relative to the variance amount of the clock number of the first reference clock 3 of the RC oscillator 2 used in the time measurement. As a result, it is possible to accurately measure the time with the timer 8 during the high speed processing operation, thereby making it possible to accurately perform the high speed operation at a low cost.

Figure 3:
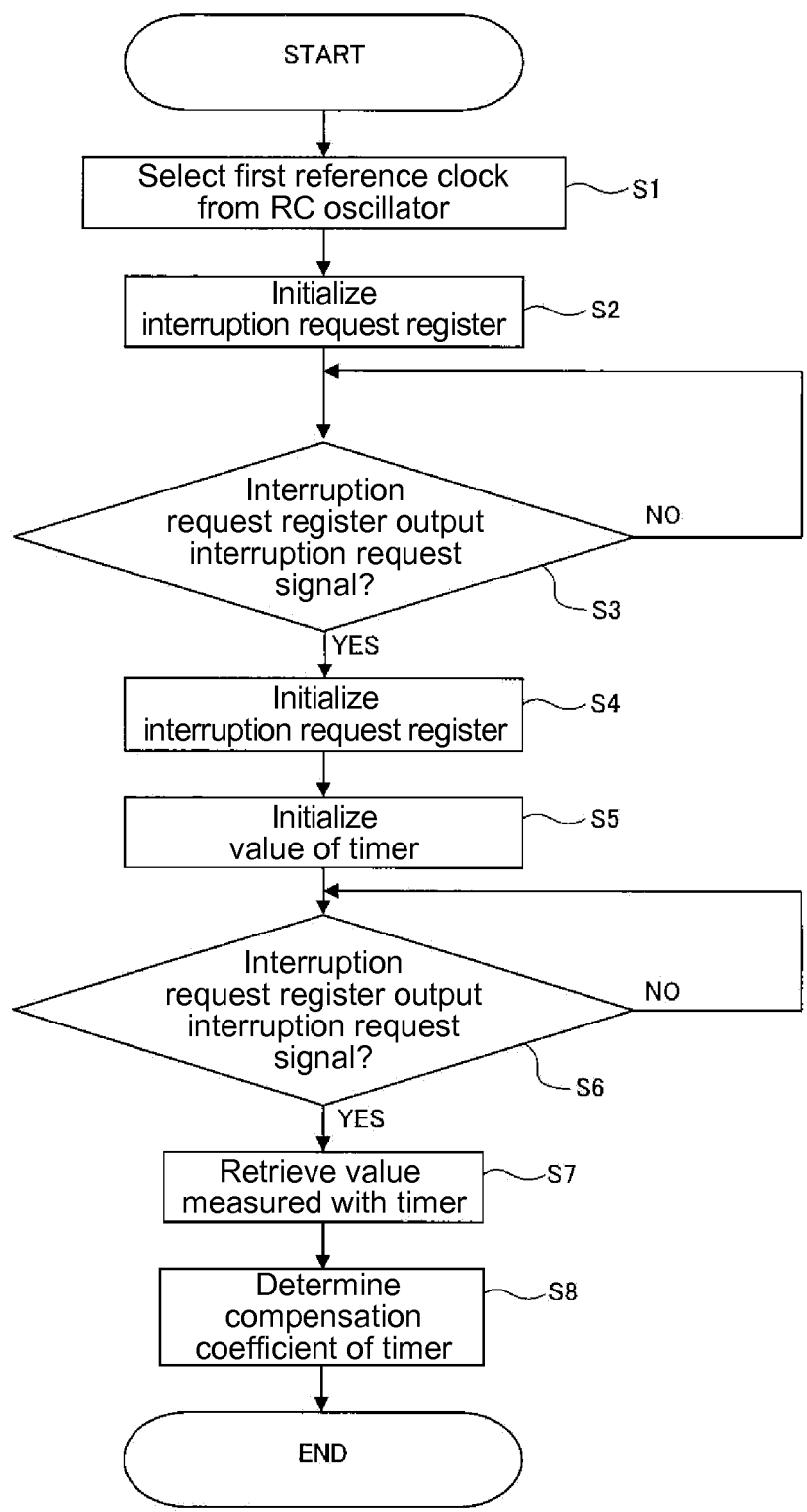
FIG. 3 is a flow chart showing an example No. 1 of a processing operation of the micro-controller according to the first embodiment of the present invention.
Figure 4:
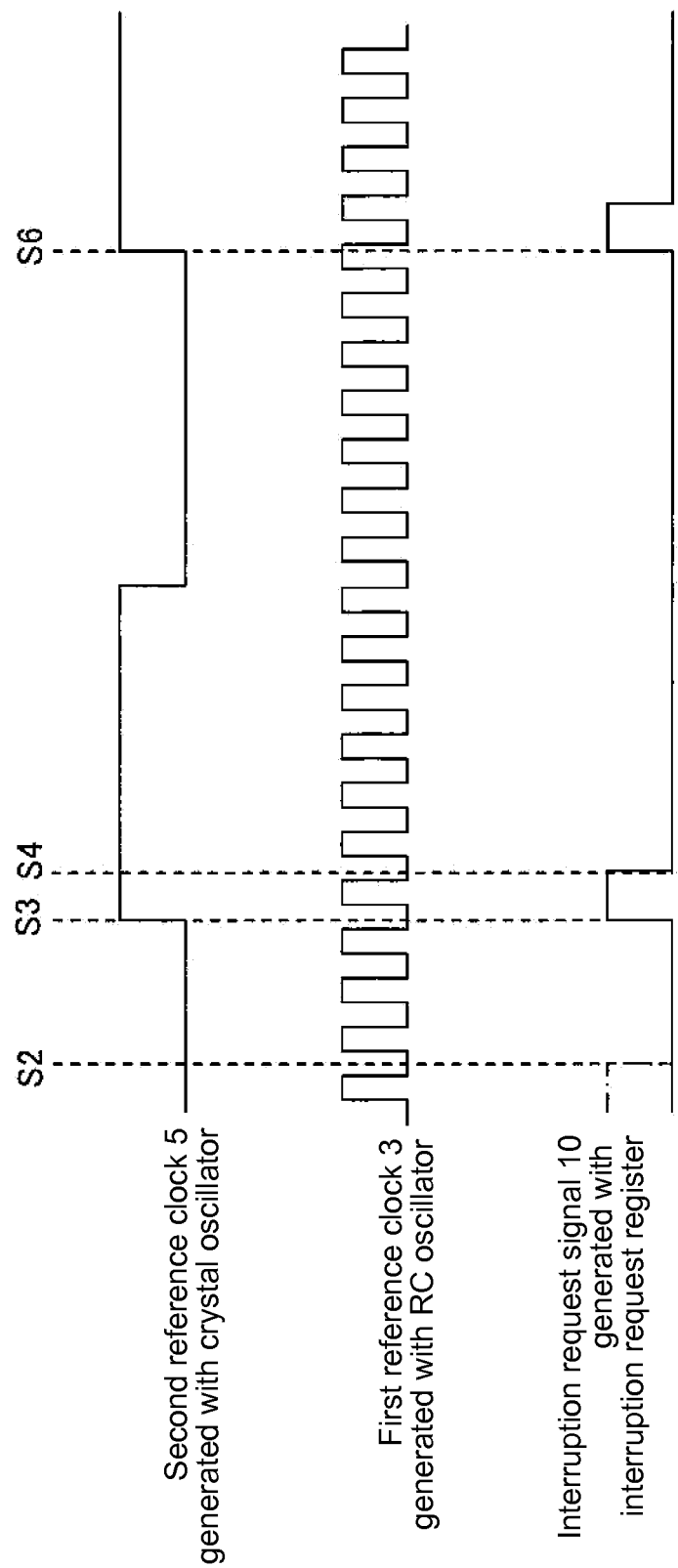
FIG. 4 is a time chart showing an example No. 1 of an operation of the micro-controller in a time measurement compensation process according to the first embodiment of the present invention.

An operation of the micro-controller 1 in a time measurement compensation process will be explained in more detail with reference to FIGS. 3 to 4. FIG. 3 is a flow chart showing an example No. 1 of the processing operation of the micro-controller 1 according to the first embodiment of the present invention. FIG. 4 is a time chart showing an example No. 1 of the operation of the micro-controller 1 in the time measurement compensation process according to the first embodiment of the present invention.

In the processing operation shown in FIG. 3, the timer 8 is operated using the first reference clock 3 with the high frequency generated with the RC oscillator 2. Further, the CPU 13 executes the program to determine the timer compensation coefficient used for improving the accuracy of the time measurement of the timer 8.

In step S1, the reference clock selection unit 6 is set to select the first reference clock 3 from the RC oscillator 2 as the clock to be measured with the timer 8. In step S2, the interruption request register 9 is cleared (initialized).

In step S3, it is determined through polling whether the interruption request register 9 outputs the interruption request signal 10. In step S4, when it is determined that the interruption request register 9 outputs the interruption request signal 10, the interruption request register 9 is cleared (initialized). In step S5, the value of the timer 8 is cleared (initialized). In step S6, it is determined whether the interruption request register 9 outputs the interruption request signal 10. Accordingly, the start point of next one cycle of the second reference clock 5 generated from the crystal oscillator 4 is detected.

During the process in step S6, the timer 8 measures the clock number of the first reference clock 3 from the RC oscillator 2 within one cycle of the second reference clock 5 from the crystal oscillator 4. In step S7, when the start point of next one cycle of the second reference clock 5 is detected during the process in step S6, the value measured with the timer 8 is retrieved. That is, the clock number of the first reference clock 3 from the RC oscillator 2 within one cycle of the second reference clock 5 from the crystal oscillator 4 is retrieved.

In step S8, the compensation coefficient of the timer 8 is determined from the measurement value of the timer 8 retrieved in step S7.

In the embodiment, the compensation coefficient is determined as follows. The clock number of the first reference clock 3 actually measured in the process in step S7 is defined as an actual clock number A, and the clock number of the first reference clock 3 from the RC oscillator 2 determined in advance as the reference within one cycle of the second reference clock 5 from the crystal oscillator 4 is defined as a reference clock number B. Accordingly, the compensation coefficient C is determined through the following equation:

$$C = A/B$$

In the embodiment, when the compensation coefficient C is determined as described above, the operational relationship among the first reference clock 3 from the RC oscillator 2, the second reference clock 5 from the crystal oscillator 4, and the interruption request signal 10 of the interruption request register 9 is represented by the time chart shown in FIG. 4.

In FIG. 4, the first reference clock 3 generated with the RC oscillator 2 and the second reference clock 5 generated with the crystal oscillator 4 correspond to the first reference clock 3 generated with the RC oscillator 2 and the second reference clock 5 generated with the crystal oscillator 4 shown in FIG. 2, respectively. Further, the timings S2 to the crystal oscillator 4 and the timing S6 shown in FIG. 4 correspond to the steps S2 to the crystal oscillator 4 and the step S6 shown in FIG. 3, respectively.

As shown in FIG. 4, at the timing S2, the CPU 13 shown in FIG. 2 clears (initializes) the interruption request register 9 in the process in step S2 shown in FIG. 3. At the timing S3, the interruption request register 9 detects the start point of one cycle of the second reference clock 5 from the crystal oscillator 4, so that the interruption request register 9 generates the interruption request signal 10.

Further, the CPU 13 detects through the polling that the interruption request register 9 generates the interruption request signal 10. At the timing S4, the CPU 13 clears (initializes) the interruption request register 9. It should be noted that after the timer 8 is cleared (initialized) once at the timing S3, the timer 8 starts measuring the clock number of the first reference clock 3 from the RC oscillator 2.

At the timing S6, the interruption request register 9 detects the start point of next one cycle of the second reference clock 5 from the crystal oscillator 4, so that the interruption request register 9 generates the interruption request signal 10. Further, the CPU 13 detects through the polling that the interruption request register 9 generates the interruption request signal 10, and clears (initializes) the interruption request register 9.

As described above, the CPU 13 retrieves the actual clock number of the first reference clock 3 from the RC oscillator 2 within one cycle of the second reference clock 5 from the crystal oscillator 4, so that the CPU 13 determines the compensation coefficient.

Figure 5:
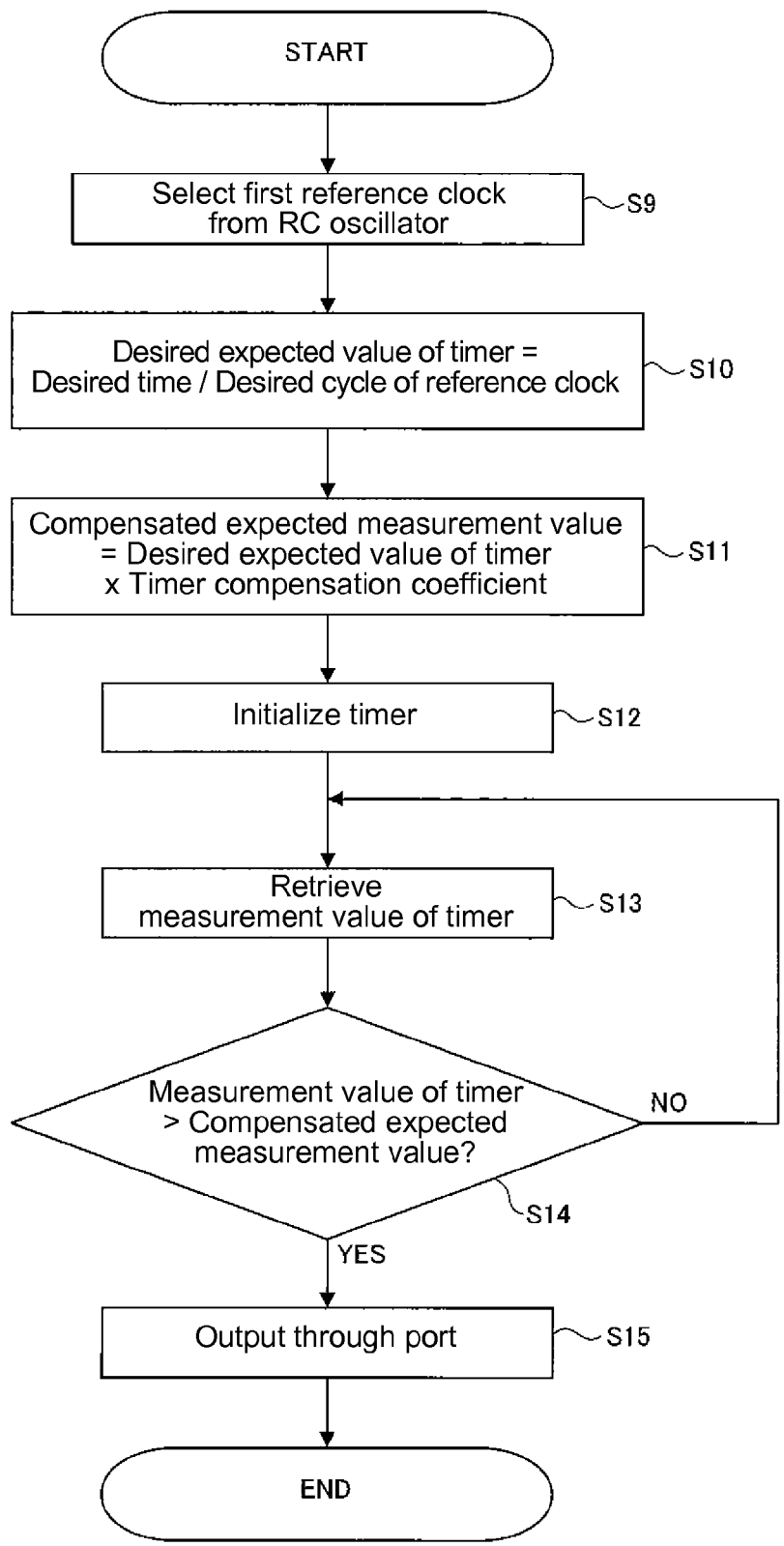
FIG. 5 is a flow chart showing an example No. 2 of the processing operation of the micro-controller according to the first embodiment of the present invention.

Next, using the compensation coefficient determined through the process described above, a process of improving the accuracy of the time measurement of the timer 8 will be explained. FIG. 5 is a flow chart showing an example No. 2 of the processing operation of the micro-controller 1 according to the first embodiment of the present invention.

In step S9, the reference clock selection unit 6 is set to select the first reference clock 3 from the RC oscillator 2 as the clock to be measured with the timer 8.

In step S10, the desired expected value (the expected measurement value 101$e$) of the timer 8 is determined in advance and stored in the recording device such as the ROM 14. The desired expected value (the expected measurement value 101$e$) of the timer 8 is obtained by dividing the desired time to be measured with the timer 8 by the desired cycle of the reference clock of the RC oscillator 2, that is, the reference clock number. It is noted that the reference clock number is determined in advance as the clock number of the first reference clock 3 from the RC oscillator 2 within one cycle of the second reference clock 5 from the crystal oscillator 4. More specifically, the compensated expected measurement value is obtained with the following equation:

Desired expected value of timer=Desired time/Desired cycle of reference clock

In step S11, the expected measurement value 101$e$ of the timer 8 after the compensation (the compensated expected measurement value) is determined and stored in the recording device such as the ROM 14. The compensated expected measurement value is obtained by multiplying the desired expected value (the expected measurement value 101$e$) of the timer 8 obtained in step S10 by the timer compensation coefficient obtained in step S8 shown in FIG. 3. More specifically, the compensated expected measurement value is obtained with the following equation:

Compensated expected measurement value=Desired expected value of timer×Timer compensation coefficient In step S12, the timer 8 is cleared (initialized) once. In step S13, the measurement value of the timer 8 is retrieved. In step S14, it is determined whether the measurement value of the timer 8 is greater than the expected measurement value 101e of the timer 8 after the compensation (the compensated expected measurement value). When it is determined that the measurement value of the timer 8 is smaller than the expected measurement value 101e of the timer 8 after the compensation, the process in step S13 is repeated.

In step S15, when it is determined that the measurement value of the timer 8 is greater than the expected measurement value 101e of the timer 8 after the compensation, the time information indicating the time corresponding to the compensated expected measurement value is lapsed is output through the port 12.

Figure 6:
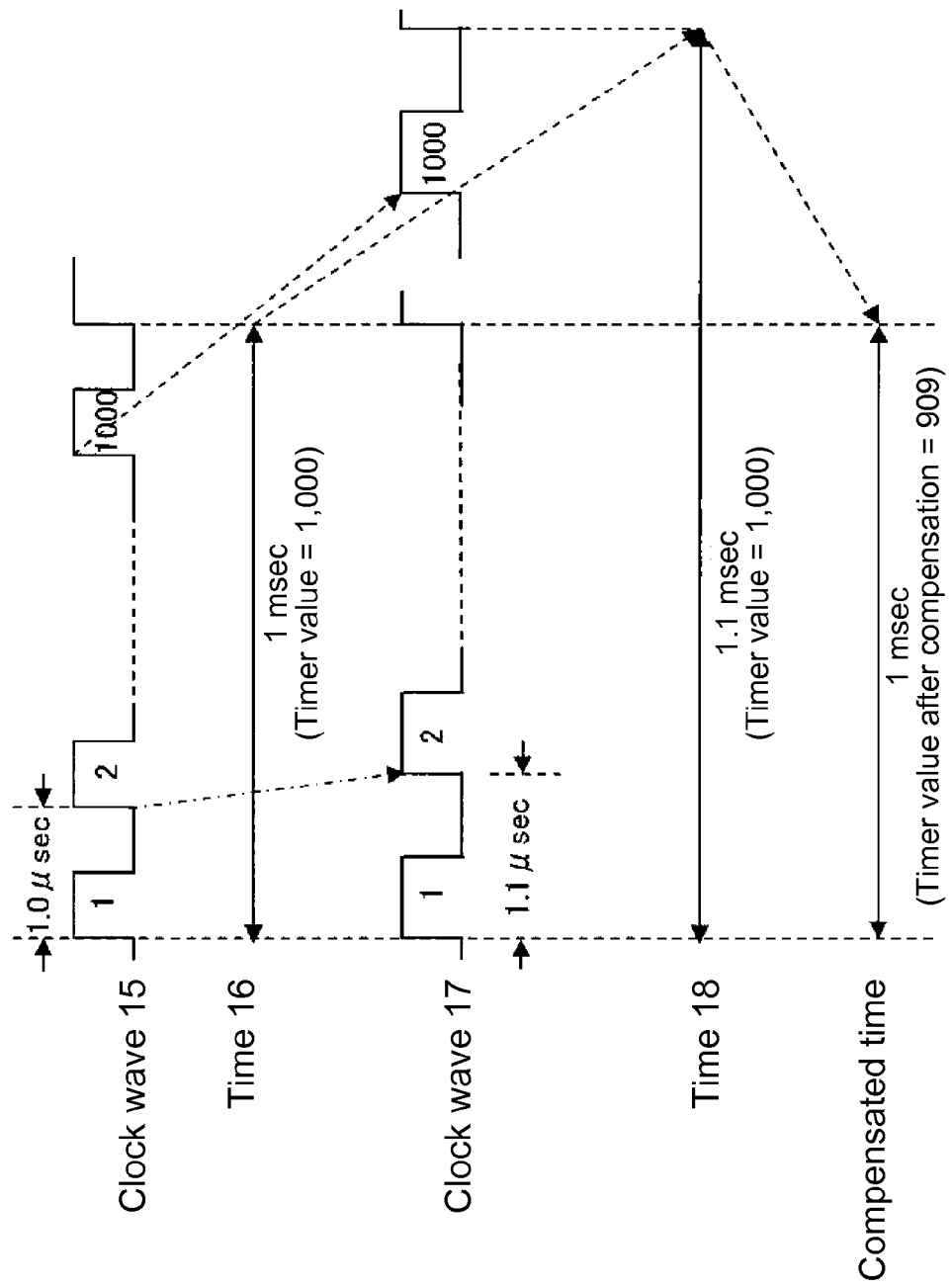
FIG. 6 is a time chart showing an example No. 2 of the operation of the micro-controller in the time measurement compensation process according to the first embodiment of the present invention.

Next, the process of determining the timer compensation coefficient and the process of compensating the error of the time measurement operation of the timer 8 using the timer compensation coefficient will be explained in more detail with reference to a time chart shown in FIG. 6. FIG. 6 is the time chart showing an example No. 2 of the operation of the micro-controller 1 in the time measurement compensation process according to the first embodiment of the present invention.

In the following description, as an example of determining the timer compensation coefficient, it is assumed that the oscillation cycle of the second reference clock 5 from the crystal oscillator 4 is 1.0 msec. Further, as represented with a clock wave 15 shown in FIG. 6, the oscillation cycle of the first reference clock 3 from the RC oscillator 2 in the normal operation is 1.0 μsec.

As represented with a clock wave 17 shown in FIG. 6, when the oscillation cycle of the first reference clock 3 from the RC oscillator 2 is varied to 1.1 μsec., the clock number of the first reference clock 3 from the RC oscillator 2 retrieved in the process in step S7 shown in FIG. 3 becomes 909.

More specifically, when one cycle of the second reference clock 5 from the crystal oscillator 4 is 1.0 msec., and the actual oscillation cycle of the first reference clock 3 from the RC oscillator 2 is varied to 1.1 μsec., the timer 8 measures the clock number of the first reference clock 3 within 1.0 msec. of one cycle of the second reference clock 5 as follows:

1.0 msec./1.1 μsec.=909

It is noted that when the oscillation cycle of the first reference clock 3 from the RC oscillator 2 is the desired value of 1.0 μsec., the timer 8 measures 1,000 as the reference clock number within 1.0 msec. of one cycle of the second reference clock 5 from the crystal oscillator 4.

As explained above the compensation coefficient C of the timer 8 is determined through the following equation:

$C=A/B$

Accordingly, when the clock number of the first reference clock 3 from the RC oscillator 2 retrieved in the process in step S7 shown in FIG. 3 becomes 909, the compensation coefficient C of the timer 8 is determined to be 0.909 (C=0.909) as follows:

909/1,000=0.909

Next, using the timer compensation coefficient (C=0.909) determined through the process described above, the process of improving the accuracy of the time measurement of the timer 8 at the high oscillation frequency from the RC oscillator 2 will be explained.

Before conducting the compensation, in the micro-controller 1, as represented with the clock wave 15 shown in FIG. 6, when the desired cycle of the RC oscillator 2 is varied from 1.0 μsec. to 1.1 μsec., the measurement time of the timer 8 is extended from the desired value of 1.0 msec. to 1.1 msec. as represented with a time 16 and a time 18 shown in FIG. 6.

In order to compensate the above error, first, the desired expected value (the expected measurement value 101e) of the timer 8 to be stored in the process in step S10 shown in FIG. 5 is obtained according to the following equation:

Desired expected value of timer=Desired time/Desired cycle of reference clock

According to the equation, the desired expected value (the expected measurement value 101e) of the timer 8 becomes 1,000 (1.0 msec./1.0 μsec.=1,000). In the next step, the desired expected value (the expected measurement value 101e) of the timer 8 (=1,000) thus obtained is multiplied by the timer compensation coefficient (=0.909) obtained in the process in step S8 shown in FIG. 3, thereby determining the desired expected value (the expected measurement value 101e) of the timer 8 after the compensation (the compensated expected measurement value). In the example shown in FIG. 6, the compensated expected measurement value becomes 909 (1,000×0.909=909).

In the next step, the timer 8 starts measuring the clock number of the first reference clock 3 from the RC oscillator 2, so that the clock number measured with the timer 8 is retrieved until the measurement value of the timer 8 reaches the compensated expected measurement value of 909. In the example shown in FIG. 6, the desired expected value (the expected measurement value 101e) of the timer 8 after the compensation (the compensated expected measurement value) is 909. Accordingly, the measurement of the timer 8 is repeatedly retrieved for 1.0 msec. (909×1.1 μsec.=1.0 msec.). As a result, the measurement time of the timer 8 becomes 1.0 msec., that is, the measurement time is compensated.

For example, when the pulse signal of 1.0 msec. is generated from an external terminal through the port 12 of the micro-controller 1, the pulse signal width becomes 1.1 msec. without the compensation technique described above. However, with the compensation technique described above, it is possible to generate the pulse signal width of 1.0 msec.

As described above, in the embodiment, the clock number of the first reference clock 3 from the RC oscillator 2 within one cycle of the second reference clock 5 from the crystal oscillator 4 is measured. Then, the compensation coefficient is obtained according to the clock number of the first reference clock 3. According to the compensation coefficient, the expected measurement value 101e used in the time measurement of the timer 8, to which the first reference clock 3 is input from the RC oscillator 2, is compensated.

It should be noted that in order to accurately obtain the compensation coefficient, it is necessary to use the RC oscillator 2 with the high frequency and the crystal oscillator 4 with the low frequency.

More specifically, in order to increase the resolution of the timer 8, it is necessary to use the RC oscillator 2 with the high frequency. In the embodiment, when the timer 8 measures the clock number using the RC oscillator 2 with the high frequency, the time measurement of the timer 8 is compensated using the crystal oscillator 4 with the low frequency, which possesses the high accuracy and is not expensive.

As described in the section of BACKGROUND OF THE INVENTION AND RELATED ART STATEMENT, in order to increase the resolution of the time, Patent Reference 1 has disclosed the conventional technique. In the conventional technique disclosed in Patent Reference 1, the frequency of the reference clock from the crystal oscillator is divided.

On the other hand, in the embodiment, the RC oscillator 2 with the high frequency is provided. Accordingly, it is possible to increase the resolution of the timer 8 without dividing the frequency of the second reference clock 5 from the crystal oscillator 4. As a result, as opposed to the conventional technique using the frequency division, it is possible to shorten a processing time of calculating the compensation coefficient.

As described above with reference to FIGS. 2 to 6, in the embodiment, the CPU 13 retrieves and executes the program stored in the ROM 14, so that the CPU 13 constitutes the calculation unit 101b, the compensation unit 101c, and the output unit 101d of the time measurement device 101. With the configuration, it is possible to accurately measure the time with the timer 8 at the low cost in the computer device that performs the high speed operation with the clock number of the RC oscillator 2 with the high oscillation frequency as the system clock.

More specifically, as shown in FIG. 2, in the micro-controller 1 in the embodiment, the timer 8 (the measurement unit 101a) measures the clock number of the reference clock (the first reference clock 3) from the RC oscillator 2 used as the system clock during the high speed operation. With the function of the CPU 13 as the calculation unit 101b, when the reference clock (the second reference clock 5) having the oscillation frequency smaller than that of the first reference clock 3 is input from the crystal oscillator 4 with the high oscillation accuracy, the timer 8 measures the clock number of the first reference clock 3 within one cycle of the second reference clock 5 thus input.

Further, with the function of the CPU 13 as the calculation unit 101b, it is configured to calculate the physical amount indicating the variance amount of the clock number of the first reference clock 3 measured with the timer 8 relative to the reference clock number using the clock number measured with the timer 8 and the reference clock number measured in advance as the clock number of the first reference clock signal 3 within one cycle of the second reference clock signal 5.

In the embodiment, with the function of the CPU 13 as the compensation unit 101c, it is configured to compensate the expected measurement value 101e determined in advance relative to the clock number of the first reference clock signal 3 according to the physical amount thus calculated. Further, with the function of the CPU 13 as the output unit 101d, it is configured to retrieve the clock number of the first reference clock 3 measured with the timer 8. Further, it is configured to output the time information indicating that the time corresponding to the expected measurement value 101e is elapsed when the clock number of the first reference clock signal 3 measured with the timer 8 reaches the expected measurement value 101e thus compensated.

It is noted that in the micro-controller 1 in the embodiment, the interruption request register 9 (a synchronization signal generating unit) is provided for generating the synchronization signal per each cycle of the second reference clock 5. With the function of the CPU 13 as the calculation unit 101b, the CPU 13 performs the polling to determine whether the interruption request register 9 generates the synchronization signal. When the CPU 13 determines that the interruption request register 9 generates the synchronization signal, the CPU 13 controls the timer 8 to measure the clock number of the reference clock (the first reference clock 3) from the RC oscillator 2 within one cycle of the reference clock (the second reference clock 5) from the crystal oscillator 4. In the next step, the CPU 13 sequentially retrieves the measurement values, so that the CPU 13 retrieves the clock number of the reference clock (the first reference clock 3) from the RC oscillator 2 within one cycle of the reference clock (the second reference clock 5) from the crystal oscillator 4.

Further, in the next step, the CPU 13 calculates the ratio between the clock number thus retrieved and the reference clock number as the physical amount. In the next step, with the function of the CPU 13 as the compensation unit 101c, the expected measurement value 101e is compensated according to the ratio calculated with the function of the CPU 13 as the calculation unit 101b. In the next step, with the function of the CPU 13 as the output unit 101d, the CPU 13 performs the polling to determine whether the clock number of the reference clock (the first reference clock 3) from the RC oscillator 2 reaches the expected measurement value 101e compensated with the function of the CPU 13 as the compensation unit 101c. When the CPU 13 determines that the clock number reaches the expected measurement value 101e thus compensated, the CPU 13 outputs the time information.

In the embodiment, the reference clock selection unit 6 is provided for selecting one of the reference clock (the first reference clock 3) from the RC oscillator 2 and the reference clock (the second reference clock 5) from the crystal oscillator 4 as the system clock 7. Further, the timer 8 is provided for measuring the clock number of the system clock 7 selected with the reference clock selection unit 6.

Second Embodiment

A second embodiment of the present invention will be explained next with reference to FIGS. 7 to 10. In the first embodiment, when the compensation operation is performed, the second reference clock 5 from the crystal oscillator 4 to be input as the control signal is conducted through the polling. In the second embodiment, the second reference clock 5 from the crystal oscillator 4 is input through an interruption processing.

Figure 7:
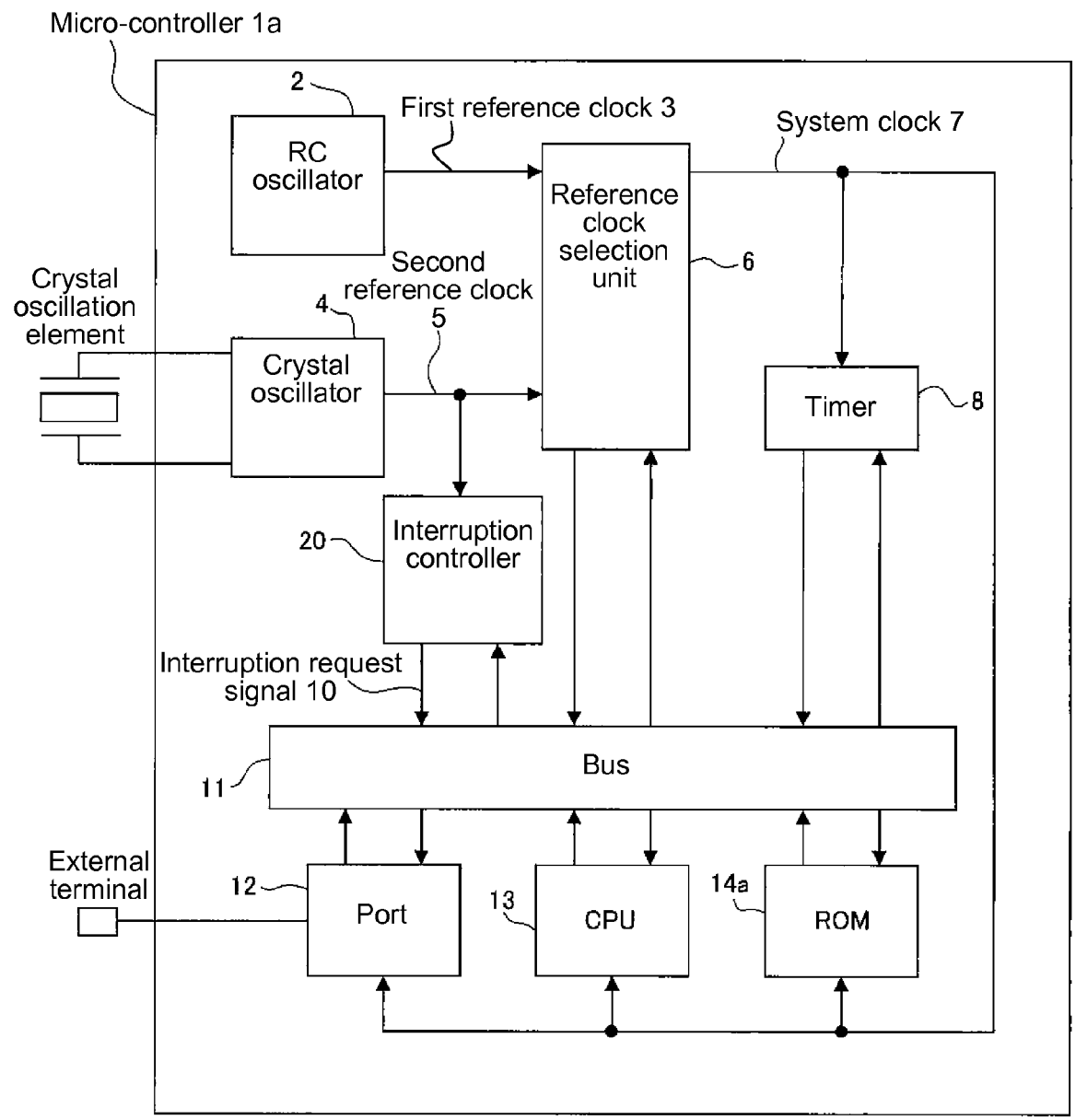
FIG. 7 is a block diagram showing an example of a configuration of a micro-controller provided with a time measurement device according to a second embodiment of the present invention.

FIG. 7 is a block diagram showing an example of a configuration of a micro-controller 1a provided with a time measurement device according to the second embodiment of the present invention.

As shown in FIG. 7, instead of the interruption request register 9 in the micro-controller 1 in the first embodiment shown in FIG. 4, the micro-controller 1a includes an interruption controller 20. Other configurations of the micro-controller 1a are similar to those of the micro-controller 1, and explanations thereof are omitted.

In the second embodiment, the interruption controller 20 is provided for generating an interruption every cycle of the crystal oscillator 4. Further, the interruption controller 20 is provided for generating an interruption when the measurement value of the timer 8 reaches the expected measurement value set in a timer data register (not shown) disposed in, for example, the interruption controller 20.

In the micro-controller 1a with the configuration described above in the second embodiment, it is possible to perform the high speed processing operation at the low cost according to the reference clock (the first reference clock 3) as the oscillation clock signal with the high frequency from the RC oscillator 2.

Further, in the micro-controller 1a, in order to prevent the problem in the time measurement operation of the timer 8 during the high speed operation according to the reference clock (the first reference clock 3) from the RC oscillator 2, the CPU 13 retrieves and executes a program stored in an ROM 14a for performing the time measurement operation, so that the error generated in the time measurement operation of the timer 8 during the high speed operation is compensated.

In the second embodiment, the CPU 13 is configured to retrieve the clock number of the first reference clock 3 measured with the timer 8 within one cycle of the second reference clock 5. Then, the CPU 13 calculates the ratio between the clock number thus retrieved and the clock number of the first reference clock 3 measured in advance with the timer 8 within one cycle of the second reference clock 5 as the physical amount. In the next step, the expected measurement value is compensated according to the ratio thus calculated.

In the micro-controller 1a with the configuration described above in the second embodiment, it is possible to accurately measure the time with the timer 8 when the high speed operation is performed according to the first reference clock 3 with the high oscillation frequency from the RC oscillator 2, thereby making it possible to perform the high speed operation at the low cost with the high accuracy.

Further, in the second embodiment, the micro-controller 1a includes a power save mode, in which, for example, the CPU 13 stops operating and only peripheral circuits are operating to reduce power consumption of the micro-controller 1a.

In the micro-controller 1 in the first embodiment, the CPU 13 performs the polling relative to the interruption request register 9, so that the start point and the end point of the clock of the crystal oscillator 4 are detected when the compensation coefficient is calculated as shown in FIG. 3. Accordingly, the CPU 13 is always in the operational state, thereby making it difficult to switch to the power save mode.

Similarly, in the micro-controller 1 in the first embodiment, in the port output process in step S15 shown in the flow chart shown in FIG. 5, the CPU 13 performs the polling relative to the measurement value of the timer 8, so that the port output is conducted when the measurement value exceeds the expected measurement value 101e of the timer 8 after the compensation. Accordingly, it is difficult to switch to the power save mode.

On the other hand, in the second embodiment, the micro-controller 1a includes the interruption controller 20 for generating the interruption at the rising of the clock of the crystal oscillator 4.

More specifically, when the compensation coefficient is calculated, the start point and the end point of the clock of the crystal oscillator 4 are detected through the interruption of the interruption controller 20, thereby making it possible to stop the operation of the CPU 13. Accordingly, when the start point and the end point of the clock of the crystal oscillator 4 are detected, it is possible to switch to the power save mode.

Similarly, in the port output process in step S15 shown in the flow chart shown in FIG. 5, the interruption controller 20 generates the interruption when the measurement value reaches the expected measurement value after the compensation. Accordingly, when the timer 8 is in the operational state, it is possible to switch the micro-controller 1a to the power save mode.

Next, the time measurement operation of the micro-controller 1a in the second embodiment will be explained with reference to FIGS. 8 to 10.

First, with reference to FIG. 8, the operation of determining the timer compensation coefficient will be explained. The timer compensation coefficient is determined for improving the time measurement accuracy of the timer 8 when the timer 8 is operated with the first reference clock 3 generated with the RC oscillator 2.

Figure 8:
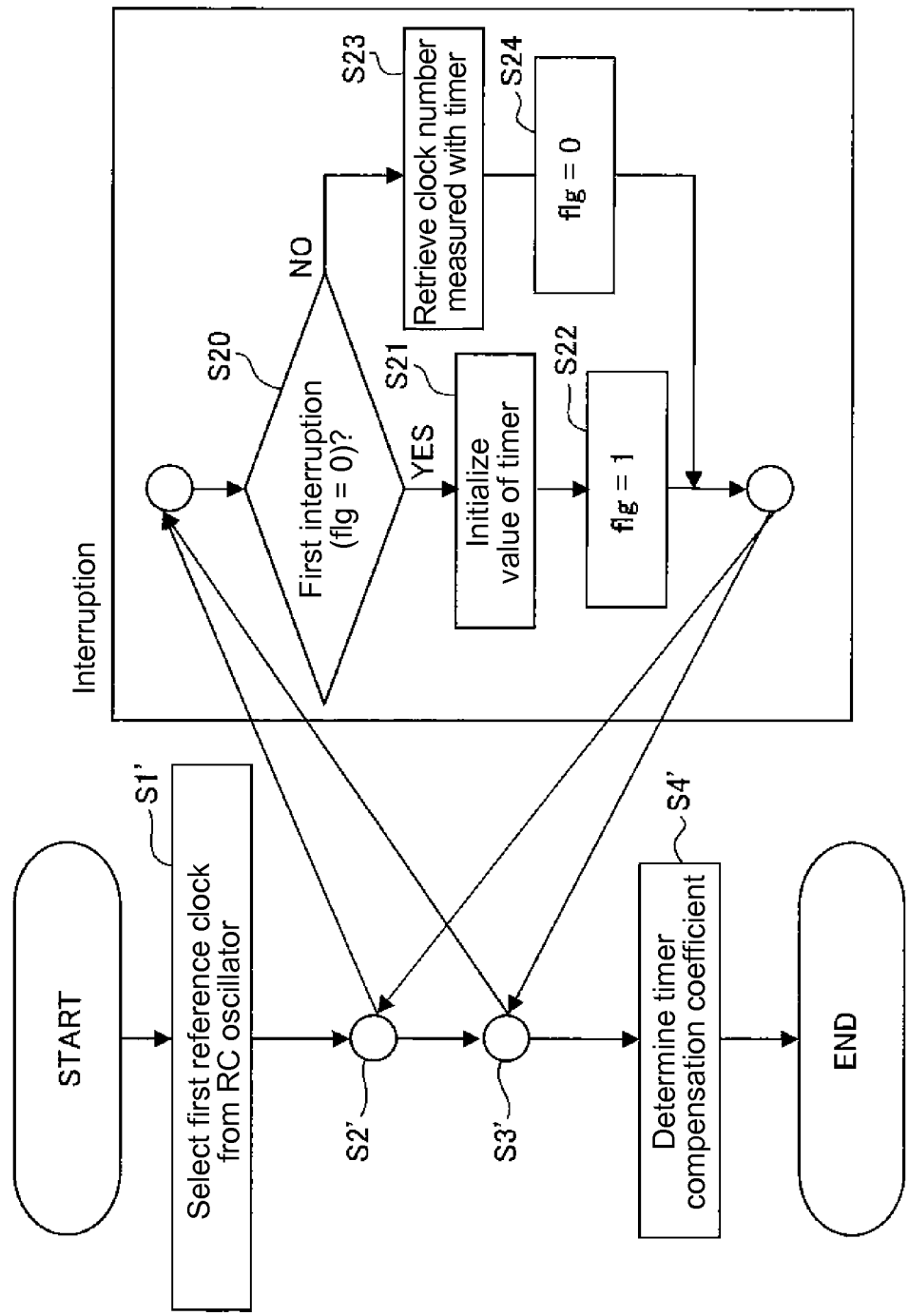
FIG. 8 is a flow chart showing an example No. 1 of a processing operation of the micro-controller according to the second embodiment of the present invention.

FIG. 8 is a flow chart showing an example No. 1 of the processing operation of the micro-controller 1a according to the second embodiment of the present invention.

In step S1', the reference clock selection unit 6 is set to select the first reference clock 3 with the high frequency from the RC oscillator 2 as the clock to be input into the timer 8. In step S2', the process waits until the interruption controller 20 generates the interruption at the start point (the rising of the clock) of one cycle of the clock of the crystal oscillator 4.

In step S20, when the interruption controller 20 generates the interruption, the CPU 13 determines whether the interruption is the first interruption (flg=0) with reference to flag information (flg: the default value is zero) indicating that the interruption is the first interruption.

In step S21, when the CPU 13 determines that the interruption is the first interruption (flg=0), the CPU 13 clears (initializes) the value of the timer 8. In step S22, the CPU 13 changes the flag information (flg=1) indicating that the first interruption (the interruption for one cycle) is generated.

In step S3', the process waits until the interruption controller 20 generates the interruption at the end point (the start point of the next cycle) of one cycle of the clock of the crystal oscillator 4.

In step S20, when the interruption controller 20 generates the interruption for the next cycle, the CPU 13 determines that the interruption is the second interruption (flg=1), so that the process proceeds to step S23. In step S23, the CPU 13 retrieves the clock number of the first reference clock 3 measured with the timer 8 within one cycle of the second reference clock 5 of the crystal oscillator 4. In step S24, the flag flg is cleared (initialized, flg=0). In step S4', the timer compensation coefficient is determined from the value of the timer 8 thus retrieved.

Next, the process of improving the time measurement accuracy of the timer 8 using the first reference clock 3 with the high oscillation frequency from the RC oscillator 2 using the timer compensation coefficient obtained in step S4' will be explained in more detail with reference to a flow chart shown in FIG. 9.

Figure 9:
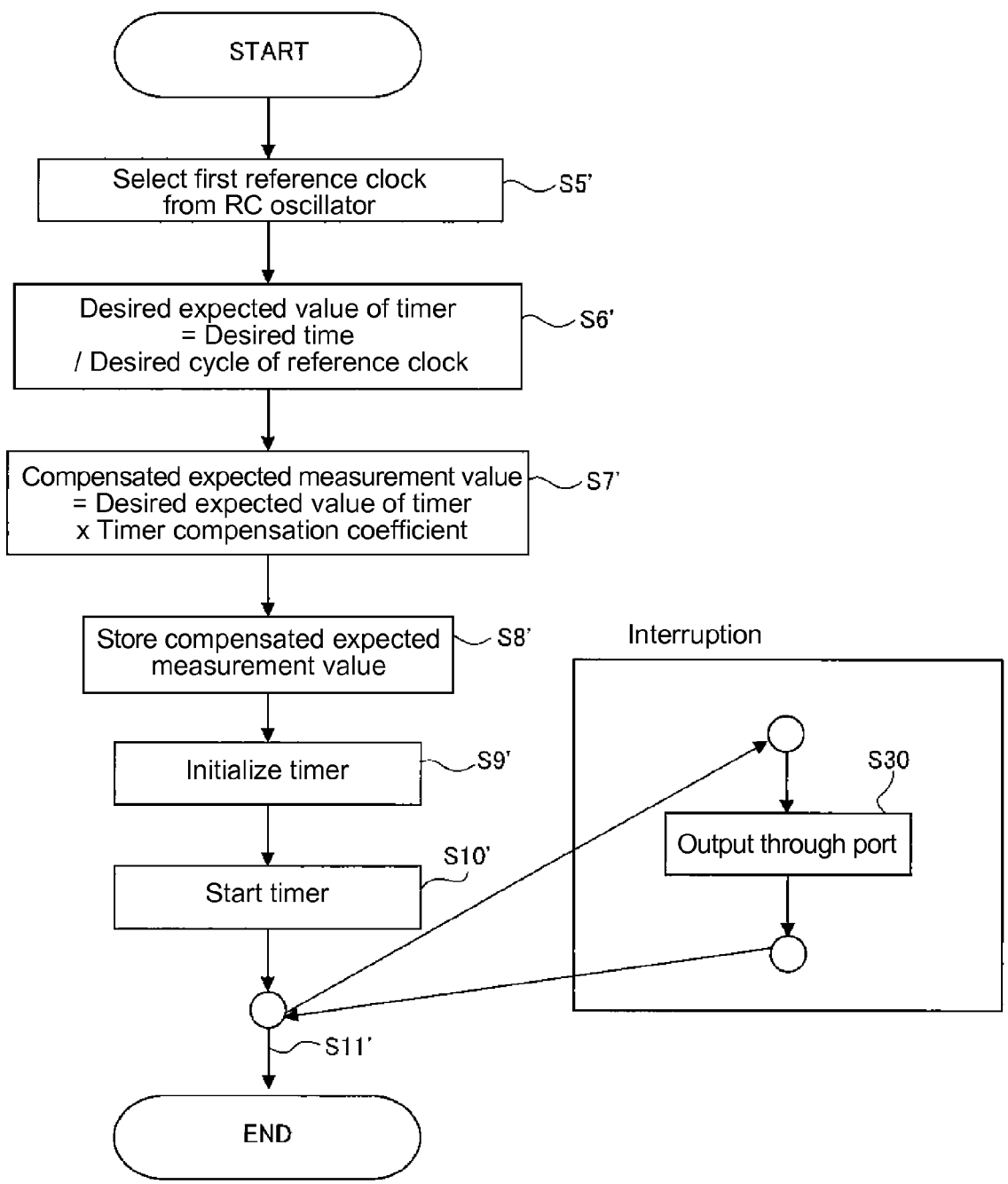
FIG. 9 is a flow chart showing an example No. 2 of the processing operation of the micro-controller according to the second embodiment of the present invention.

FIG. 9 is the flow chart showing an example No. 2 of the processing operation of the micro-controller according to the second embodiment of the present invention.

In step S5', the reference clock selection unit 6 is controlled to set so that the first reference clock 3 from the RC oscillator 2 is input into the timer 8.

In step S6', the desired expected value of the timer 8 is determined in advance and stored in the recording device such as the ROM 14a. The desired expected value of the timer 8 is obtained by dividing the desired time to be measured with the timer 8 by the desired cycle of the reference clock of the RC oscillator 2, that is, the reference clock number. It is noted that the reference clock number is determined in advance as the clock number of the first reference clock 3 from the RC oscillator 2 within one cycle of the second reference clock 5 from the crystal oscillator 4. More specifically, the compensated expected measurement value is obtained with the following equation:

Desired expected value of timer=Desired time/Desired cycle of reference clock

In step S7', the desired expected value of the timer 8 after the compensation (the compensated expected measurement value) is determined and stored in the recording device such as the ROM 14. The compensated expected measurement value is obtained by multiplying the desired expected value of the timer 8 obtained in step S6' by the timer compensation coefficient obtained in step S4' shown in FIG. 8. More specifically, the compensated expected measurement value is obtained with the following equation:

Compensated expected measurement value=Desired expected value of timer×Timer compensation coefficient In step S8', the compensated expected measurement value is stored in, for example, the timer data register disposed in the interruption controller 20.

In step S9', the timer 8 is cleared (initialized) once. In step S10', the measurement operation of the timer 8 is started. In step S11', the process waits until the interruption is entered from the interruption controller 20 according to the measurement result of the timer 8. During the wait period, it is possible to stop the CPU 13 or perform other process.

When the measurement value of the timer 8 reaches the expected measurement value after the compensation (the compensated expected measurement value), the interruption signal (the timer interruption) from the interruption controller 20 is entered. In step S30, the CPU 13 outputs the time information through the port 12 indicating the time corresponding to the compensated expected measurement value is elapsed.

As described above, in the micro-controller 1a in the second embodiment, with the interruption controller 20, the start point and the end point (the start point of the next cycle) of the clock of the crystal oscillator 4 are detected through the interruption when the compensation coefficient is calculated. Further, the port output is preformed through the interruption using the timer compensation coefficient.

Accordingly, in the second embodiment, it is possible to stop the operation of the CPU 13 until the interruption occurs. FIG. 10 is a time chart showing an example of the operation of the micro-controller 1a in the time measurement compensation process according to the second embodiment of the present invention.

Figure 10:
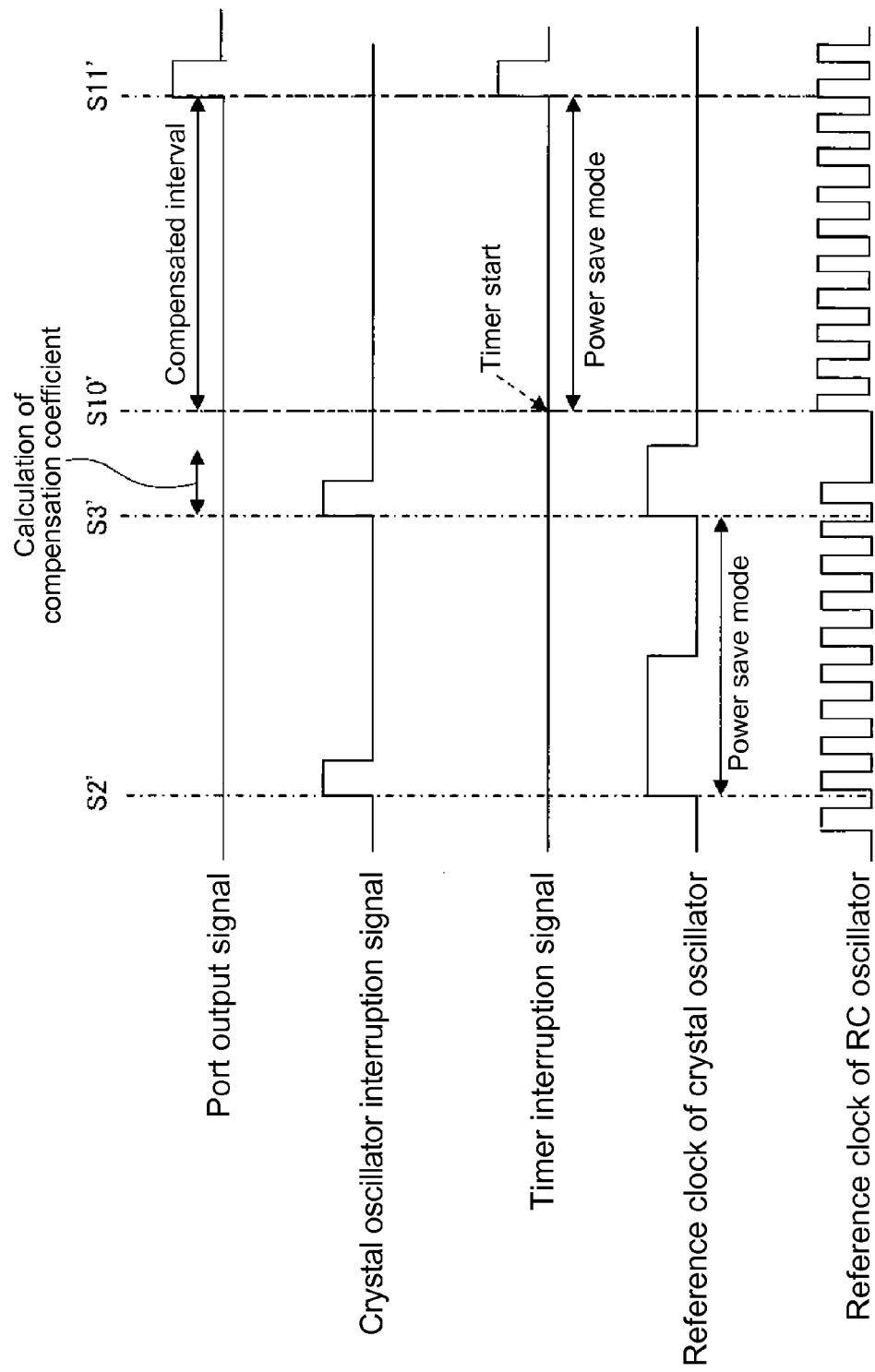
FIG. 10 is a time chart showing an example of an operation of the micro-controller in a time measurement compensation process according to the second embodiment of the present invention.

As shown in FIG. 10, it is possible to create the period of the power save mode. Accordingly, it is possible to reduce the power consumption of the micro-controller 1a. Further, during the period of the power save mode, the CPU 13 may be able to perform other process.

In FIG. 10, the time chart shows the operational timing of each of the signals in the second embodiment. The signals include the port output signal, the crystal oscillator interruption signal, the timer interruption signal, the reference clock (the second reference clock 5) of the crystal oscillator 4, and the reference clock (the first reference clock 3) of the RC oscillator 2.

Further, in FIG. 10, the timings S2', S3', S10' and S11' correspond to the steps S2', S3', S10' and S11' shown in FIGS. 8 and 9, respectively.

As shown in FIG. 10, at the timing S2', the reference clock (the second reference clock 5) of the crystal oscillator 4 starts rising, and the crystal oscillator interruption signal rises, so that the timer 8 starts measuring the reference clock (the first reference clock 3) of the RC oscillator 2. At the timing S3', the next cycle of the reference clock (the second reference clock 5) of the crystal oscillator 4 starts rising, and the crystal oscillator interruption signal rises, so that the timer 8 repeatedly measures the reference clock (the first reference clock 3) of the RC oscillator 2 until the timing S3'.

In the second embodiment, it is noted that during the period of time when the timer 8 repeatedly measures the reference clock (the first reference clock 3) of the RC oscillator 2, the CPU 13 is in the power save mode.

In the second embodiment, when the next cycle of the reference clock (the second reference clock 5) of the crystal oscillator 4 starts rising, and the crystal oscillator interruption signal rises at the timing S3', the CPU 13 performs the calculation process of the compensation coefficient and the compensation process of the expected measurement value as shown in FIG. 8.

After the CPU 13 completes the calculation process of the compensation coefficient and the compensation process of the expected measurement value, at the timing S10', the timer 8 starts measuring the reference clock (the first reference clock 3) of the RC oscillator 2 (the timer start) relative to the expected measurement value thus compensated.

In the second embodiment, it is noted that during the period of time when the timer 8 measures the reference clock (the first reference clock 3) of the RC oscillator 2, the CPU 13 is in the power save mode.

In the second embodiment, when the measurement value of the reference clock (the first reference clock 3) of the RC oscillator 2 measured with the timer 8 reaches the expected measurement value thus compensated at the timing S11', the timer interruption signal is generated. Accordingly, the CPU 13 performs the port output process in step S30 shown in FIG. 9.

As described above, in the second embodiment, the micro-controller 1a is provided with the interruption controller 20 as shown in FIG. 7. The interruption controller 20 is configured to output the first interruption signal per every cycle of the reference clock (the second reference clock 5) from the crystal oscillator 4. Further, the interruption controller 20 is configured to output the second interruption signal when the clock number of the reference clock (the first reference clock 3) from the RC oscillator 2 measured with the timer 8 reaches the expected measurement value compensated with the function of the CPU 13 as the compensation unit 101c.

Further, in the second embodiment, with the function of the CPU 13 as the calculation unit 101b, when the interruption controller 20 outputs the first interruption signal, the CPU 13 controls the timer 8 to start measuring the clock number of the first reference clock 3, and waits until the next interruption signal is output. When the next interruption signal is output, the CPU 13 retrieves the clock number of the first reference clock 3 measured with the timer 8 before as the clock number of the first reference clock 3 within one cycle of the second reference clock 5. Then, the CPU 13 is configured to calculate the ratio of the clock number thus retrieved to the clock number of the first reference clock 3 within one cycle of the second reference clock 5 determined in advance as the physical amount.

Further, in the second embodiment, with the function of the CPU 13 as the compensation unit 101c, the expected measurement value is compensated according to the ratio calculated with the function of the CPU 13 as the calculation unit 101b. In the next step, after the expected measurement value is compensated with the function of the CPU 13 as the compensation unit 101c, with the function of the CPU 13 as the output unit 101d, the CPU 13 controls the timer 8 to start measuring the clock number of the first reference clock 3, and waits until the interruption controller 20 outputs the second interruption signal indicating that the measurement value of the timer 8 reaches the expected measurement value. When the interruption controller 20 outputs the second interruption signal, the CPU 13 outputs the time information.

Further, in the second embodiment, as shown in FIGS. 7 to 9, with the function of the CPU 13 as the calculation unit 101b, the CPU 13 determines whether the first interruption signal is the first interruption when the interruption controller 20 outputs the first interruption signal. When the CPU 13 determines that the first interruption signal is the first interruption, the CPU 13 initializes the measurement value of the timer 8 and sets the flag information indicating that the first interruption occurs.

Further, when the CPU 13 determines that the first interruption signal is not the first interruption, the CPU 13 retrieves the clock number of the reference clock (the first reference clock 3) from the RC oscillator 2 measured with the timer 8 before as the clock number of the reference clock (the first reference clock 3) within one cycle of the reference clock (the second reference clock 5) from the crystal oscillator 4, so that the CPU 13 initializes the flag information.

Further, in the micro-controller 1a in the second embodiment, as shown in FIG. 7, with the function of the CPU 13 as the calculation unit 101b, the CPU 13 is configured to calculate the ratio through dividing the clock number of the reference clock (the first reference clock 3) from the RC oscillator 2 within one cycle of the reference clock (the second reference clock 5) from the crystal oscillator 4 thus retrieved and measured with the timer 8 by the clock number of the reference clock (the first reference clock 3) within one cycle of the second reference clock 5 determined in advance. Then, with the function of the CPU 13 as the compensation unit 101c, the expected measurement value is compensated by multiplying the ratio calculated with the function of the CPU 13 as the calculation unit 101b.

As described above, in the micro-controller 1a in the second embodiment, with the interruption controller 20, it is possible to detect the start point and the end point of the reference clock (the second reference clock 5) from the crystal oscillator 4 during the calculation of the compensation coefficient and the process of outputting through the port using the timer compensation coefficient through the interruption. Accordingly, it is possible to stop the operation of the CPU 13 until the next interruption event occurs, thereby making it possible to reduce power consumption of the micro-controller 1a. Further, it is possible to perform other process during the power save mode.

Third Embodiment

A third embodiment of the present invention will be explained next with reference to FIGS. 11 and 12. In the third embodiment, the micro-controller 1a has a configuration similar to that of the micro-controller 1a in the second embodiment, and a detailed explanation thereof is omitted.

In the first and second embodiments described above, when the compensation coefficient is determined, the timer 8 is configured to measure the clock number of the reference clock (the first reference clock 3) with the high frequency from the RC oscillator 2 within one cycle of the reference clock (the second reference clock 5) from the crystal oscillator 4. However, when there is a large difference in the speeds (the difference in the frequencies) between the RC oscillator 2 and the crystal oscillator 4, the measurement value of the timer 8 may overflow. In this case, it is difficult to measure one cycle of the crystal oscillator 4 with the clock number of the RC oscillator 2.

In the third embodiment, it is configured to deal with the overflow of the measurement value of the timer 8. More specifically, when the overflow occurs when the timer 8 measures the clock number of the reference clock (the first reference clock 3) from the RC oscillator 2 within one cycle of the reference clock (the second reference clock 5) from the crystal oscillator 4, the interruption controller 20 is configured to detect the occurrence of the overflow through the bus 11, so that the interruption controller 20 outputs the interruption signal.

In the third embodiment, the CPU 13 is configured to measure the number of the overflow according to the interruption signal. In the next step, the CPU 13 is configured to calculate a product of the number of the overflow and the clock number associated with the overflow. In the next step, the CPU 13 is configured to add the product to the clock number of the reference clock (the first reference clock 3) of the RC oscillator 2 measured with the timer 8 without the overflow. In the next step, the CPU 13 is configured to retrieve the sum as the measurement value of the clock number of the reference clock (the first reference clock 3) with the high frequency from the RC oscillator 2 measured with the timer 8 within one cycle of the reference clock (the second reference clock 5) from the crystal oscillator 4. In the next step, the compensation coefficient is calculated through the process shown in FIGS. 11 and 12.

Next, the operation of the micro-controller 1a in the third embodiment having the configuration similar to that shown in FIG. 7 will be explained.

First, with reference to FIG. 11, the operation of determining the timer compensation coefficient with the CPU 13 will be explained. The timer compensation coefficient is determined for improving the time measurement accuracy of the timer 8 when the timer 8 is operated with the first reference clock 3 with the high frequency generated with the RC oscillator 2.

Figure 11:
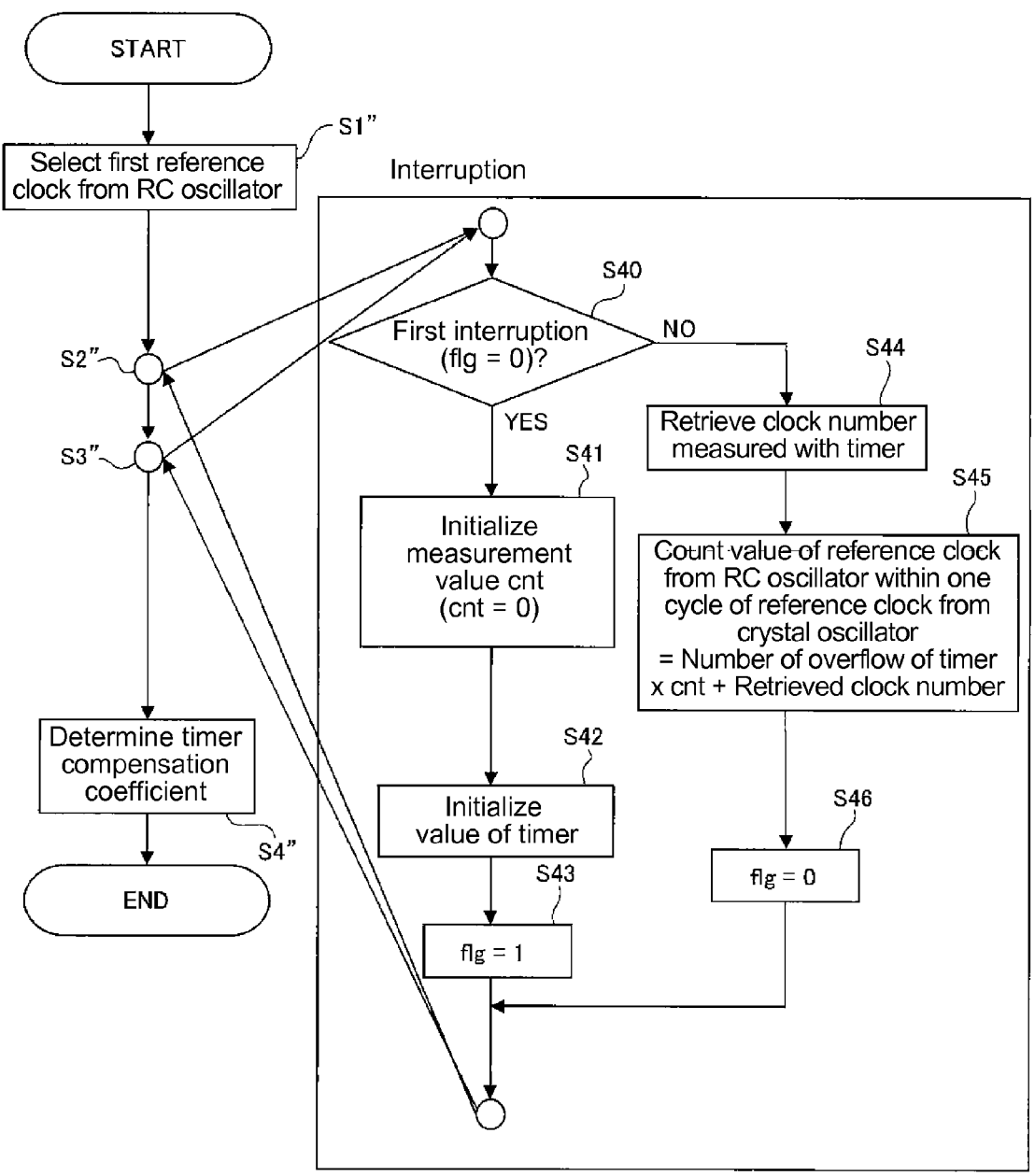
FIG. 11 is a flow chart showing an example No. 3 of the processing operation of the micro-controller according to a third embodiment of the present invention.

FIG. 11 is a flow chart showing an example No. 3 of the processing operation of the micro-controller 1a according to the third embodiment of the present invention.

In step S1", the reference clock selection unit 6 is controlled to set the first reference clock 3 with the high frequency from the RC oscillator 2 as the clock to be input into the timer 8. In step S2", the process waits until the interruption controller 20 generates the interruption at the start point (the rising of the clock) of one cycle of the clock of the crystal oscillator 4.

In step S40, when the interruption controller 20 generates the interruption, the CPU 13 determines whether the interruption is the first interruption (flg=0) with reference to the flag information (flg: the default value is zero) indicating that the interruption is the first interruption.

In step S41, when the CPU 13 determines that the interruption is the first interruption (flg=0), the CPU 13 clears (initializes) a measurement value cnt indicating the number of the overflow of the timer 8 measured with the CPU 13 (cnt=0). In step S42, the CPU 13 clears (initializes) the measurement value of the timer 8. In step S43, the CPU 13 sets the flag information (flg=1) indicating that the first interruption (the start point of one cycle) is generated.

In step S3", the process waits until the interruption controller 20 generates the interruption at the end point (the start point of the next cycle) of one cycle of the clock of the crystal oscillator 4. It is noted that when the overflow of the timer 8 occurs during the wait time, the CPU 13 measures the number of the overflow.

In step S44, when the interruption controller 20 generates the interruption for the next cycle (step S3"), the CPU 13 determines that the interruption is the second interruption (flg=1), so that the process proceeds to step S44. In step S44, the CPU 13 retrieves the clock number of the reference clock (the first reference clock 3) from the RC oscillator 2 measured with the timer 8 within one cycle of the reference clock (the second reference clock 5) from the crystal oscillator 4. In step S45, the clock number thus retrieved is added to the number of the overflow of the timer 8 measured during the wait time as the count value (the measurement value) of the reference clock (the first reference clock 3) from the RC oscillator 2 measured with the timer 8 within one cycle of the reference clock (the second reference clock 5) from the crystal oscillator 4. In step S46, the flag flg is cleared (initialized, flg=0). In step S4", the timer compensation coefficient is determined from the value of the timer 8 thus retrieved through the process shown in FIG. 8.

As described above, using the timer compensation coefficient determined in the process in step S4", the CPU 13 performs the compensation process shown in FIG. 9. Accordingly, it is possible to improve the accuracy of the time measurement of the timer 8 using the reference clock (the first reference clock 3) with the high frequency from the RC oscillator 2.

Figure 12:
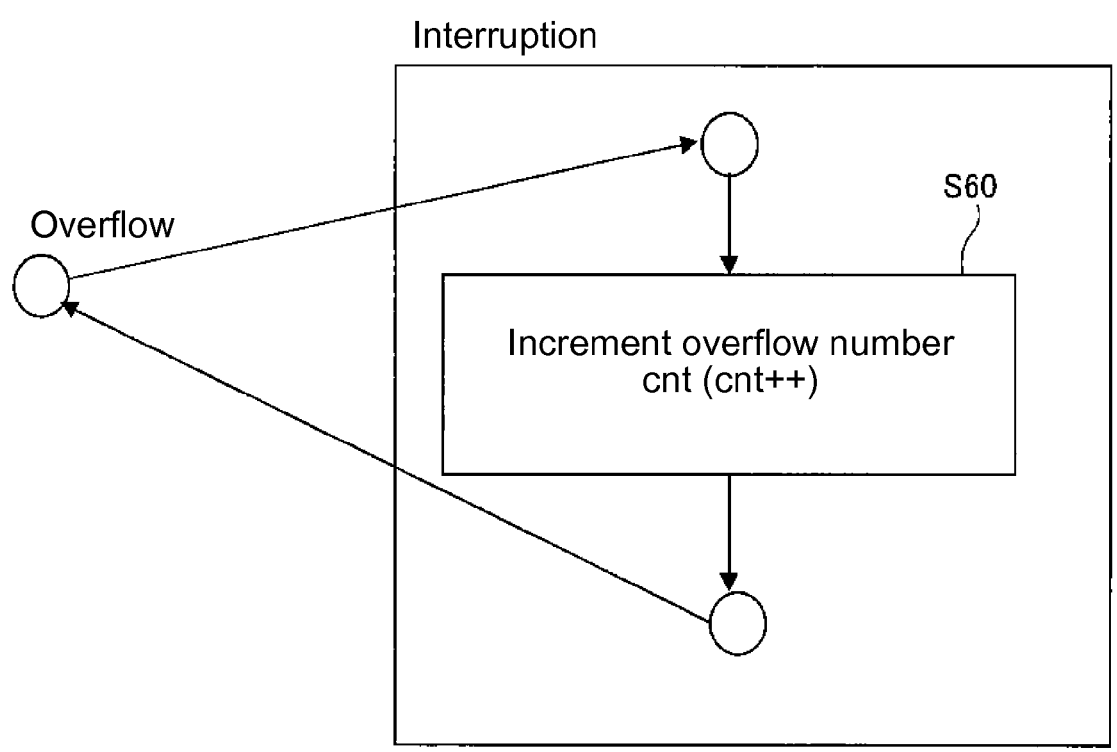
FIG. 12 is a flow chart showing an example No. 4 of the processing operation of the micro-controller according to the third embodiment of the present invention.

FIG. 12 is a flow chart showing an example No. 4 of the processing operation of the micro-controller 1a according to the third embodiment of the present invention. The flow chart shown in FIG. 12 represents the processing operation of the micro-controller 1a during the wait time in step S3" shown in FIG. 11.

More specifically, the process waits until the interruption controller 20 generates the interruption at the end point (the start point of the next cycle) of one cycle of the clock of the crystal oscillator 4. In step S60, when the overflow of the timer 8 occurs during the wait time, the overflow number cnt stored in the recording device such as the ROM 14 and the like is incremented (cnt++).

As described above, in the third embodiment, the compensation coefficient is calculated through the process shown in FIG. 11. Accordingly, even when the speed difference (the difference in the oscillation frequencies) between the RC oscillator 2 and the crystal oscillator 4 is large, and the timer 8 overflows when the timer 8 measures the reference clock (the first reference clock 3) from the RC oscillator 2, the timer 8 can measures the clock number of the RC oscillator 2 within one cycle of the crystal oscillator 4.

As described above, in the micro-controller 1a in the third embodiment, with the function of the CPU 13 as the overflow measurement unit (the second measurement unit), the CPU 13 is configured to measure the number of the overflows occurring when the timer 8 measures the clock number of the reference clock (the first reference clock 3) from the RC oscillator 2 within one cycle of the reference clock (the second reference clock 5) from the crystal oscillator 4. Further, with the function of the CPU 13 as the calculation unit 101b, the CPU 13 calculates the product of the number of the overflow calculated with the overflow measurement unit and the clock number at which the overflow occurs. Then, the CPU 13 is configured to add the product to the clock number of the reference clock (the first reference clock 3) from the RC oscillator 2 measured with the timer 8 without the overflow. At last, the CPU 13 is configured to retrieve the sum as the clock number of the reference clock (the first reference clock 3) from the RC oscillator 2 measured with the timer 8 within one cycle of the reference clock (the second reference clock 5) from the crystal oscillator 4.

Further in the micro-controller 1a in the third embodiment, every time when the overflow of the timer 8 is detected and the third interruption signal is output with the function of the interruption controller 20 as the third interruption unit, the CPU 13 measures the number of the overflow to determine whether the interruption is the first interruption with the function thereof as the overflow measurement unit. When the CPU 13 determines that the interruption is the first interruption, the measurement value of the overflow measurement unit is initialized and the measurement value of the timer 8 is initialized, so that the CPU 13 sets the flag information indicating that the first interruption occurs. When the CPU 13 determines that the interruption is not the first interruption, the CPU 13 retrieves the clock number of the first reference clock 3 measured with the timer 8 before and the number of the overflow measured with the function of the overflow measurement unit. Then, the CPU 13 performs the multiplication and the addition, and initializes the setting of the flag information.

As described above, in the third embodiment, the processing operation shown in FIG. 11 is performed to calculate the compensation coefficient. Accordingly, even when the speed difference between the RC oscillator 2 and the crystal oscillator 4 is large, and the timer 8 overflows, through measuring the number of the overflow, it is possible to count the clock number of the reference clock (the first reference clock 3) from the RC oscillator 2 measured with the timer 8 within one cycle of the reference clock (the second reference clock 5) from the crystal oscillator 4.

Fourth Embodiment

Figure 13:
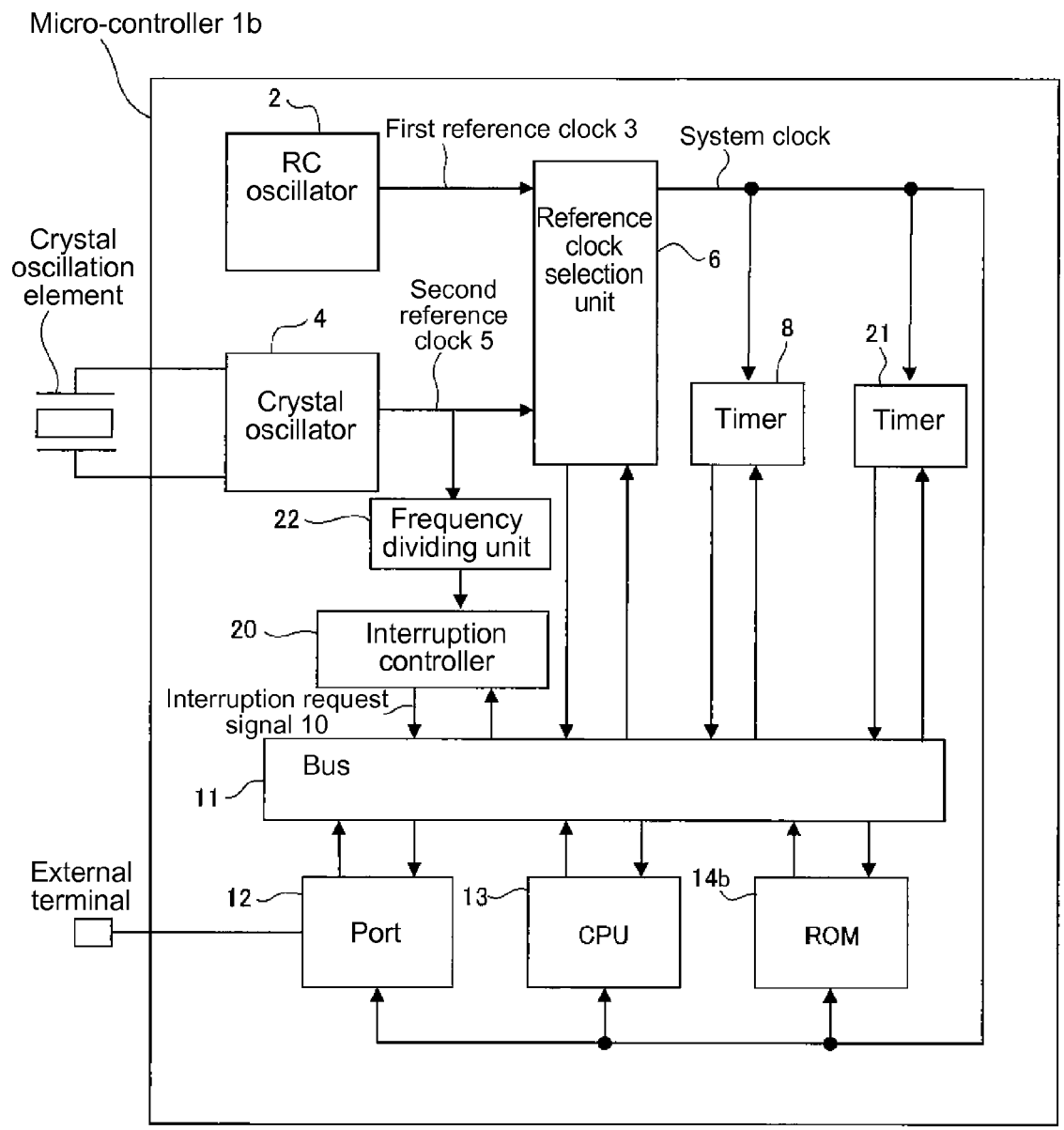
FIG. 13 is a block diagram showing an example of a configuration of a micro-controller provided with a time measurement device according to a fourth embodiment of the present invention.

A fourth embodiment of the present invention will be explained next with reference to FIG. 13. FIG. 13 is a block diagram showing an example of a configuration of a micro-controller 1b provided with the time measurement device according to the fourth embodiment of the present invention.

As shown in FIG. 13, in addition to the configuration of the micro-controller 1a shown in FIG. 7, the micro-controller 1b includes a timer 21 and a frequency dividing unit 22.

In the first to third embodiments, one timer (the timer 8) is provided. In the micro-controller 1b shown in FIG. 13, one more timer (the timer 21) is added, so that the separate timers (the timer 8 and the timer 21) are used to calculate the compensation coefficient and the timer compensation.

In the fourth embodiment, for example, the timer 8 is used to measure the clock number of the reference clock (the first reference clock 3) from the RC oscillator 2 measured with the timer 8 within one cycle of the reference clock (the second reference clock 5) from the crystal oscillator 4. Further, the timer 21 is used to measure the clock number of the reference clock (the first reference clock 3) from the RC oscillator 2 to be compared with the expected measurement value. With this configuration, even in the system in which it is necessary to output through the port in a constant interval all the time, it is possible to output through the port while compensating the timer.

Further, in the fourth embodiment, the micro-controller 1b shown in FIG. 13 includes the frequency dividing unit 22 for dividing the reference clock (the second reference clock 5) from the crystal oscillator 4. With the frequency dividing unit 22, when there is no speed difference (the difference in the oscillation frequencies) between the RC oscillator 2 and the crystal oscillator 4, it is possible to enlarge the period of time of one cycle of the crystal oscillator 4 when the oscillation frequency of the reference clock (the first reference clock 3) of the RC oscillator 2 is measured, thereby making it possible to increase the accuracy of the time measurement.

As described above, in the fourth embodiment, the micro-controller 1b includes the timer 8 (the third measurement unit) configured to measure the clock number of the reference clock (the first reference clock 3) from the RC oscillator 2 measured with the timer 8 within one cycle of the reference clock (the second reference clock 5) from the crystal oscillator 4. Further, the micro-controller 1b includes the timer 21

(the fourth measurement unit) configured to measure the clock number of the reference clock (the first reference clock 3) from the RC oscillator 2 to be compared with the expected measurement value.

As described above, in the fourth embodiment, the timer 21 is added, so that the two separate timers (the timer 8 and the timer 21) are used to calculate the compensation coefficient and the timer compensation. With the configuration, even in the system in which it is necessary to output through the port in a constant interval all the time, it is possible to output through the port while compensating the timer.

Further, in the fourth embodiment, the micro-controller 1b includes the frequency dividing unit 22 for dividing the reference clock (the second reference clock 5) from the crystal oscillator 4. Accordingly, the timer 8 is configured to measure the clock number of the reference clock (the first reference clock 3) of the RC oscillator 2 within one cycle of the reference clock (the second reference clock 5) from the crystal oscillator 4 divided with the frequency dividing unit 22.

When the frequency dividing unit 22 is provided for dividing the reference clock (the second reference clock 5) from the crystal oscillator 4, even when there is no speed difference (the difference in the oscillation frequencies) between the RC oscillator 2 and the crystal oscillator 4, it is possible to enlarge the period of time of one cycle of the crystal oscillator 4 when the oscillation frequency of the reference clock (the first reference clock 3) of the RC oscillator 2 is measured, thereby making it possible to increase the accuracy of the time measurement.

Fifth Embodiment

Figure 14:
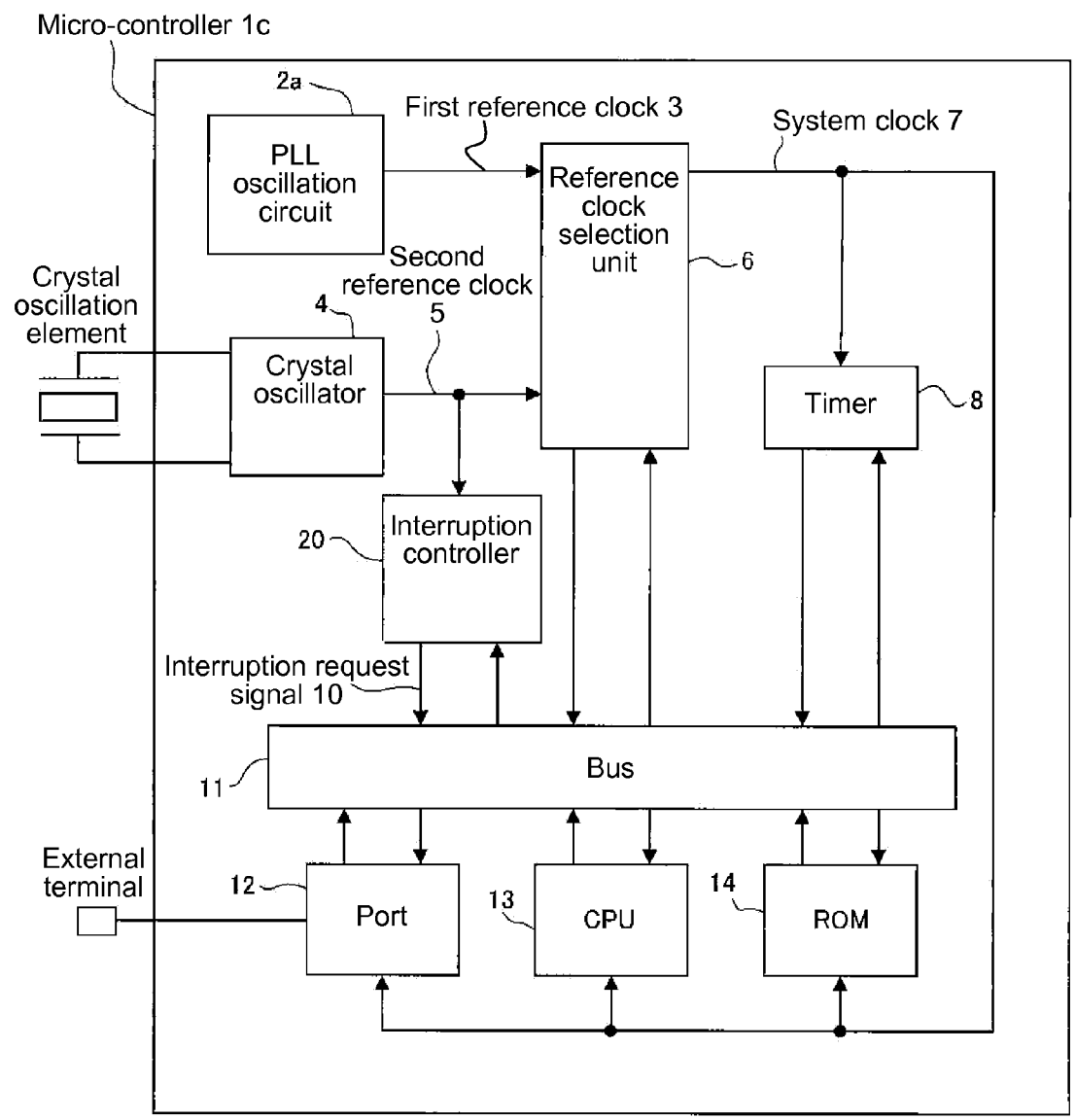
FIG. 14 is a block diagram showing an example of a configuration of a micro-controller provided with a time measurement device according to a fifth embodiment of the present invention.
Figure 15:
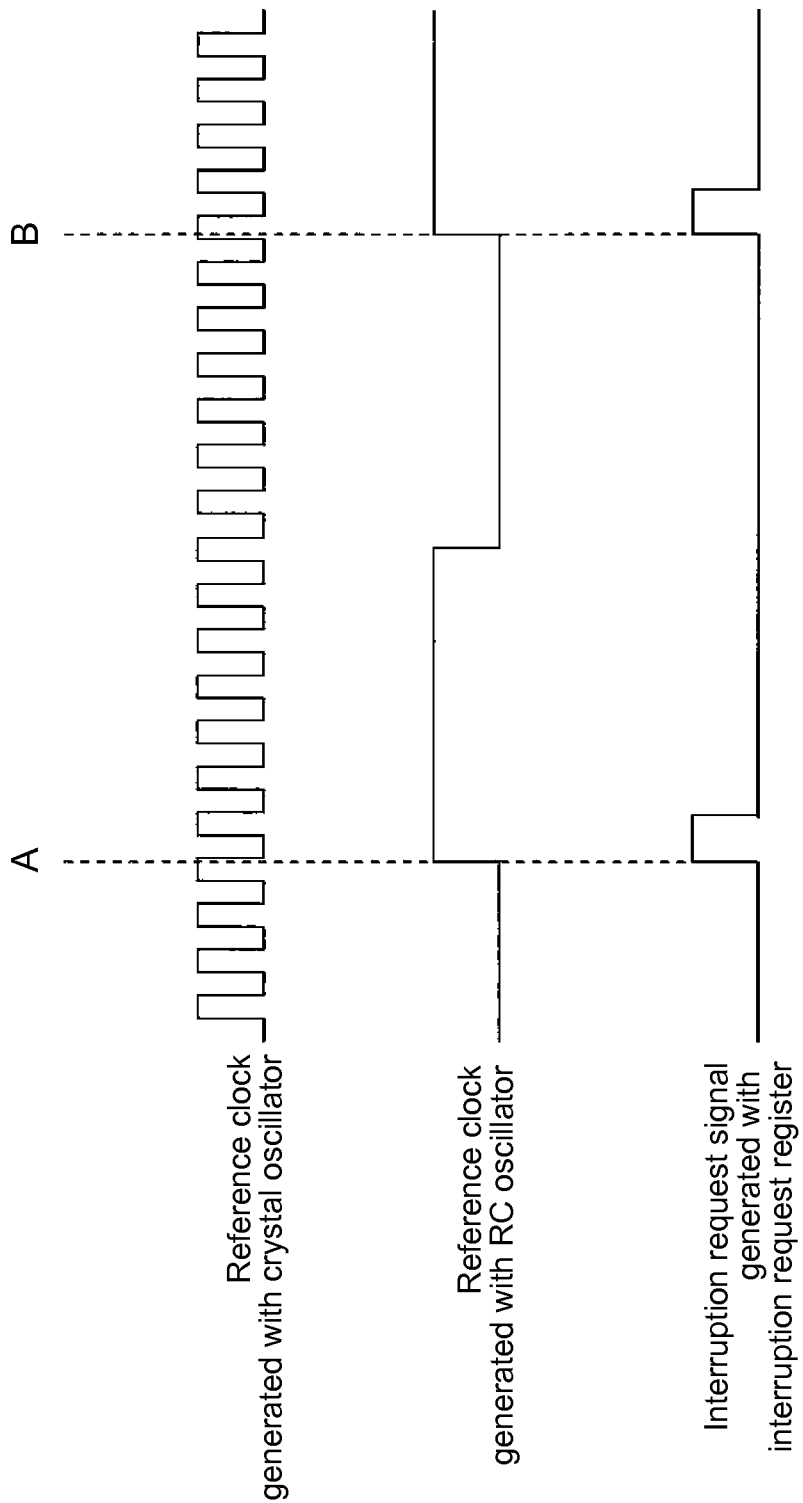
FIG. 15 is a time chart showing an example of an operation of a conventional micro-controller in a time measurement compensation process.

A fifth embodiment of the present invention will be explained next with reference to FIG. 14. FIG. 14 is a block diagram showing an example of a configuration of a micro-controller 1c provided with the time measurement device according to the fifth embodiment of the present invention.

As shown in FIG. 14, in the fourth embodiment, instead of the RC oscillator 2 in the micro-controller 1a shown in FIG. 7, the micro-controller 1c includes a PLL (Phase Locked Loop) oscillation circuit 2a.

In the first to third embodiment, it is configured to improve the accuracy of the time measurement of the timer 8 that operates with the clock generated from the RC oscillator 2. Similar to the RC oscillator 2 for the high speed operation, in the micro-controller 1c shown in FIG. 14, when the timer 8 operates with the clock generated from the PLL (Phase Locked Loop) oscillation circuit 2a instead of the RC oscillator 2, it is possible to compensate the time measurement operation of the timer 8.

As described with reference to FIGS. 1 to 14, in the embodiments, the CPU 13 is configured to read the program for the time measurement stored in the ROM 14, the ROM 14a, or the ROM 14b, so that the CPU 13 executes the program. Accordingly, the CPU 13 constitutes the functional units including the calculation unit 101b, the compensation unit 101c, and the output unit 101d. Accordingly, it is possible to perform the time measurement operation of the timer 8 with high accuracy and a low cost especially when the computer device performs the high speed operation with the clock number of the RC oscillator 2 with the high frequency as the system clock. Further, the micro-controller 1, the micro-controller 1a, the micro-controller 1b, the micro-controller 1c, and the micro-controller 100 are provided with the functions of the time measurement device 101, thereby making it possible to solve the problems of the conventional technology.

For example, in the micro-controller 1, the micro-controller 1a, the micro-controller 1b, the micro-controller 1c, and the micro-controller 100, it is not necessary to use an expensive crystal oscillator for measuring the clock cycle of the RC oscillator 2 with the high frequency. Accordingly, it is possible to effectively reduce the cost with the RC oscillator 2.

Further, in the micro-controller 1, the micro-controller 1a, the micro-controller 1b, the micro-controller 1c, and the micro-controller 100, the RC oscillator 2 is provided for generating the clock with the higher frequency than that of the crystal oscillator 4. Accordingly, as opposed to the configuration disclosed in Patent Reference 1, it is not necessary to use the crystal oscillator with the high frequency, thereby reducing the cost.

Further, as opposed to the configuration disclosed in Patent Reference 1, it is not necessary to provide the RC oscillator having the lower frequency than the crystal oscillator. Accordingly, when the compensation coefficient is accurately determined relative to the RC oscillator, it is sufficient to provide the RC oscillator having the high frequency and it is not necessary to provide the frequency dividing unit for dividing the frequency of the RC oscillator.

Further, as opposed to the configuration disclosed in Patent Reference 1, in which the one cycle of the RC oscillator is extended due to the frequency dividing unit, it is possible to shorten the processing time for measuring the clock of the crystal oscillator generated within one cycle of the RC oscillator.

Further, in the micro-controller 1b and the micro-controller 1c, with the interruption controller 20, it is possible to detect the start point and the end point of the reference clock (the second reference clock 5) from the crystal oscillator 4 during the calculation of the compensation coefficient and the process of outputting through the port using the timer compensation coefficient through the interruption request process without the polling. Accordingly, it is possible to stop the operation of the CPU 13 until the next interruption event occurs, thereby making it possible to switch the CPU 13 to the power save mode or perform other process during the wait time for the next interruption.

Further, in the micro-controller 1b, the number of the overflow of the timer 8 is counted when the compensation coefficient is calculated, and the count value is used for calculating the compensation coefficient. Accordingly, when there is the large speed difference between the RC oscillator 2 and the crystal oscillator 4, it is possible to deal with the overflow of the timer 8.

It should be noted that the present invention is not limited to the embodiments shown in FIGS. 1 to 14, and may be modified within the scope thereof.

For example, the CPU 13 is configured to read the program for the time measurement stored in the ROM 14, the ROM 14a, or the ROM 14b, so that the CPU 13 executes the program. Accordingly, the CPU 13 constitutes the functional units including the calculation unit 101b, the compensation unit 101c, and the output unit 101d. More specifically, the function of each of the functional units may be performed partially or entirely through the computer processing thus programmed. Alternatively, the function of each of the functional units may be performed with a hardware configuration formed of a logic element circuit.

Further, in the embodiments, as explained with reference to FIG. 3, when the compensation coefficient is determined, the clock number of the first reference clock 3 actually measured in the process in step S7 is defined as an actual clock number A, and the clock number of the first reference clock 3 from the RC oscillator 2 determined in advance as the reference within one cycle of the second reference clock 5 from the crystal oscillator 4 is defined as a reference clock number B. Accordingly, the compensation coefficient C is determined through the following equation:

$$C=A/B \quad (5)$$

Alternatively, the compensation coefficient C is determined through the following equation:

$$C=B/A$$

In this case, in step S11 shown in FIG. 5, the compensated expected measurement value is obtained with the following equation:

Compensated expected measurement value=Desired expected value of timer/Timer compensation coefficient (15)

Further, in the micro-controller 1 in the embodiments, the timer 8 is configured to measure the clock number of the first reference clock 3 within one cycle of the second reference clock 5 thus input. Alternatively, not limited to one cycle of the second reference clock 5 thus input, the timer 8 may be configured to measure the clock number of the first reference clock 3 within a predetermined cycle (a specific cycle).

The disclosure of Japanese Patent Application No. 2011-263991, filed on Dec. 1, 2011, is incorporated in the application by reference.

While the invention has been explained with reference to the specific embodiments of the invention, the explanation is illustrative and the invention is limited only by the appended claims.

What is claimed is:

1. A time measurement device comprising:
a first measurement unit configured to measure a clock period of a first reference clock signal within a specific cycle of a second reference clock signal, said second reference clock signal having an oscillation frequency lower than that of the first reference clock signal and oscillation accuracy higher than that of the first reference clock signal;
a calculation unit configured to calculate a physical amount indicating a variance amount of a clock period measured with the first measurement unit relative to a reference clock period measured in advance as the clock period of the first reference clock signal within the specific cycle of the second reference clock signal;
a compensation unit configured to compensate an expected measurement value indicating the clock period of the first reference clock signal corresponding to a time as a measurement target according to the physical amount calculated with the calculation unit; and
an output unit configured to output time information indicating that the clock period of the first reference clock signal reaches an expected measurement value thus compensated after a clock period of the first reference clock signal measured with the first measurement unit reaches the expected measurement value thus compensated; and
a first interruption unit configured to output a first interruption signal per cycle of the second reference clock signal;
a second interruption unit configured to output a second interruption signal after the clock period of the first reference clock signal measured with the first measurement unit reaches the expected measurement value thus compensated;
a second measurement unit configured to measure an overflow number count of an overflow that occurred when the first measurement unit measures the clock period of the first reference clock signal within the specific cycle of the second reference clock signal; and
a third interruption unit configured to output a third interruption signal when the overflow occurs,
wherein said calculation unit is configured to determine whether the first interruption signal is output for the first time after the first interruption unit outputs the first interruption signal,
said calculation unit is configured to initialize a measurement value of the first measurement unit so that the calculation unit sets flag information indicating that a first interruption occurs after the first interruption signal is output for the first time, and
said calculation unit is configured to retrieve a clock period of the first reference clock signal measured before as the clock period of the first reference clock signal within the specific cycle of the second reference clock signal so that the calculation unit initializes the flag information after the first interruption signal is not output for the first time,
said calculation unit is configured to control the first measurement unit to start measuring the clock period of the first reference clock signal after the first interruption unit outputs the first interruption signal, and to wait for a next first interruption signal,
said calculation unit is configured to retrieve the clock period of the first reference clock signal measured before as the clock period of the first reference clock signal within the specific cycle of the second reference clock signal after the first interruption unit outputs the next first interruption signal so that the calculation unit calculates a ratio between the clock period of the first reference clock signal measured before and the reference clock period as the physical amount,
said compensation unit is configured to compensate the expected measurement value according to the ratio,
said output unit is configured to control the first measurement unit to start measuring the clock period of the first reference clock signal measured with the first measurement unit after the compensation unit compensates the expected measurement value, and to wait until the second interruption unit outputs the second interruption signal,
said output unit is configured to output the time information after the second interruption unit outputs the second interruption signal,
said calculation unit is configured to calculate a product of the overflow number count of the overflow measured with the second measurement unit and a clock period that causes the overflow,
said calculation unit is configured to calculate a sum of the product of the overflow number count of the overflow and a clock period of the first reference clock signal measured with the first measurement unit without the overflow,
said calculation unit is configured to retrieve the sum as the clock period of the first reference clock signal within the specific cycle of the second reference clock signal,
said second measurement unit is configured to measure the overflow number count of the overflow when the third interruption unit outputs the third interruption signal,
said calculation unit is configured to initialize the measurement value of the first measurement unit and a measurement value of the second measurement unit so that the calculation unit sets the flag information indicating that the first interruption occurs when the calculation unit determines that the first interruption signal is output for the first time, said calculation unit is configured to retrieve the clock period of the first reference clock signal measured before and the overflow number count measured with the second measurement unit when the first interruption signal is not output for the first time, and said calculation unit is configured to calculate the product and the sum so that the calculation unit initializes the flag information.

2. The time measurement device according to claim 1, wherein said calculation unit is configured to calculate the ratio through dividing the clock period of the first reference clock signal within the specific cycle of the second reference clock signal by the reference clock period, and said compensation unit is configured to compensate the expected measurement value through multiplying the expected measurement value by the ratio calculated with the calculation unit.

3. The time measurement device according to claim 1, further comprising:

a synchronization signal generating unit configured to generate a synchronization signal per cycle of the second reference clock signal, wherein said calculation unit is configured to determine whether the synchronization signal generating unit generates the synchronization signal through polling, said calculation unit is configured to control the first measurement unit to measure the clock period of the first reference clock signal measured with the first measurement unit until the synchronization signal generating unit generates a next synchronization signal when the synchronization signal generating unit generates the synchronization signal, said calculation unit is configured to retrieve the clock period of the first reference clock signal measured with the first measurement unit as the clock period of the first reference clock signal within the specific cycle of the second reference clock signal so that the calculation unit calculates a ratio between the clock period thus retrieved and the reference clock period as the physical amount, said compensation unit is configured to compensate the expected measurement value according to the ratio, said output unit is configured to determine through polling whether the clock period of the first reference clock signal measured with the first measurement unit reaches the expected measurement value thus compensated, and said output unit is configured to output the time information when the clock period of the first reference clock signal reaches the expected measurement value.

4. The time measurement device according to claim 1, further comprising:

at least one of an RC oscillator and a PLL (Phase Locked Loop) oscillator for generating the first reference clock signal; and a crystal oscillator for generating the second reference clock signal.

5. The time measurement device according to claim 1, wherein said first measurement unit includes a third measurement unit for measuring the clock period of the first reference clock signal within the specific cycle of the second reference clock signal, and a fourth measurement unit for measuring the clock period of the first reference clock signal measured with the first measurement unit to be compared with the expected measurement value thus compensated.

6. The time measurement device according to claim 1, further comprising a frequency dividing unit for dividing a frequency of the second reference clock signal, wherein said first measurement unit is configured to measure the clock period of the first reference clock signal within the specific cycle of the second reference clock signal divided by the frequency dividing unit.

7. The time measurement device according to claim 1, further comprising a reference clock selection unit for selecting one of the first reference clock signal and the second reference clock signal as a system clock, wherein said first measurement unit is configured to measure a clock period of the system clock selected with the reference clock selection unit.

8. A micro-controller comprising the time measurement device according to claim 1.

9. A method of measuring a time, comprising:

a first measurement step of measuring a clock period of a first reference clock signal within a specific cycle of a second reference clock signal, said second reference clock signal having an oscillation frequency lower than that of the first reference clock signal and oscillation accuracy higher than that of the first reference clock signal;

a calculation step of calculating a physical amount indicating a variance amount of a clock period of the first reference clock signal measured in the first measurement step relative to a reference clock period measured in advance as the clock period of the first reference clock signal measured in the first measurement step within the specific cycle of the second reference clock signal;

a compensation step of compensating an expected measurement value indicating the clock period of the first reference clock signal corresponding to a time as a measurement target according to the physical amount calculated in the calculation step; and an output step of outputting time information indicating that the clock period of the first reference clock signal measured in the first measurement step reaches the expected measurement value when the clock period of the first reference clock signal measured in the first measurement step reaches the an expected measurement value thus compensated; and a first interruption step of outputting a first interruption signal per cycle of the second reference clock signal;

a second interruption step of outputting a second interruption signal after the clock period of the first reference clock signal measured in the first measurement step reaches the expected measurement value thus compensated;

a second measurement step of measuring an overflow number count of an overflow that occurred when the clock period of the first reference clock signal is measured within the specific cycle of the second reference clock signal in the first measurement step; and a third interruption step of outputting a third interruption signal when the overflow occurs, wherein, in the calculation step, it is determined whether the first interruption signal is output for the first time when the first interruption signal is output in the first interruption step, in the calculation step, a measurement value in the first measurement step is initialized so that flag information indicating that a first interruption occurs is set when the first interruption signal is output for the first time, and in the calculation step, said clock period of a first reference clock signal measured before is retrieved as the clock period of the first reference clock signal within the specific cycle of the second reference clock signal so that the flag information is initialized when the first interruption signal is not output for the first time said clock period of the first reference clock signal measured in the first measurement step starts being measured after the first interruption signal is output in the measurement step, and a next first interruption signal waits for being output in the first interruption step, in the calculation step, the clock period of the first reference clock signal before is retrieved as the clock period of the first reference clock signal within the specific cycle of the second reference clock signal after the next first interruption signal is output so that a ratio between the clock period of the first reference clock signal before and the reference clock period is calculated as the physical amount, in the compensation step, said expected measurement value is compensated according to the ratio, said clock period of the first reference clock signal measured in the first measurement step starts being measured after the expected measurement value is compensated in the measurement step, and the second interruption signal waits for being output in the second interruption step, and in the output step, said time information is output after the second interruption signal is output in the second interruption step, said clock period of the first reference clock signal measured in the first measurement step starts being measured after the first interruption signal is output in the measurement step, and a next first interruption signal waits for being output in the first interruption step, in the calculation step, the clock period of the first reference clock signal before is retrieved as the clock period of the first reference clock signal within the specific cycle of the second reference clock signal after the next first interruption signal is output so that a ratio between the clock period of the first reference clock signal before and the reference clock period is calculated as the physical amount, in the compensation step, said expected measurement value is compensated according to the ratio, said clock period of the first reference clock signal measured in the first measurement step starts being measured after the expected measurement value is compensated in the measurement step, and the second interruption signal waits for being output in the second interruption step, in the output step, said time information is output after the second interruption signal is output in the second interruption step, in the calculation step, a product of the overflow number count measured in the second measurement step and a clock period that causes the overflow is calculated, in the calculation step, a sum of the product of the overflow number count and a clock period of the first reference clock signal measured in the first measurement step without the overflow is calculated, in the calculation step, the sum is retrieved as the clock period of the first reference clock signal within the specific cycle of the second reference clock signal, in the second measurement step, said overflow number count of the overflow is measured when the third interruption unit outputs the third interruption signal, in the calculation step, said measurement value in the first measurement step and a measurement value in the second measurement step are initialized so that the flag information indicating that the first interruption occurs is set when it is determined that the first interruption signal is output for the first time, in the calculation unit step, said clock period of the first reference clock signal measured before and the overflow number count of the overflow are retrieved when it is determined that the first interruption signal is not output for the first time, and in the calculation step, said product and the sum are calculated so that the flag information is initialized.

10. The method of measuring the time according to claim 9, wherein, in the calculation step, said ratio is calculated through dividing the clock period of the first reference clock signal within the specific cycle of the second reference clock signal by the reference clock period, and in the compensation step, said expected measurement value is compensated through multiplying the expected measurement value by the ratio calculated in the calculation step.

11. The method of measuring the time according to claim 9, further comprising:

a synchronization signal generating step of generating a synchronization signal per cycle of the second reference clock signal, wherein, in the calculation step, it is determined whether the synchronization signal through polling is generated in the synchronization signal generating step, in the first measurement step, said clock period of the first reference clock signal measured in the first measurement step is measured until a next synchronization signal is generated in the synchronization signal generating step when the synchronization signal is generated in the synchronization signal generating step, in the calculation step, said clock period of the first reference clock signal thus measured in the first measurement step is retrieved as the clock period of the first reference clock signal within the specific cycle of the second reference clock signal so that a ratio between the clock period thus retrieved and the reference clock period is calculated as the physical amount, in the compensation step, said expected measurement value is compensated according to the ratio, in the output step, it is determined through polling whether the clock period of the first reference clock signal measured with the first measurement unit reaches the expected measurement value thus compensated, and in the output step, said time information is output when the clock period of the first reference clock signal reaches the expected measurement value.

12. The method of measuring the time according to claim 9, further comprising the steps of:

generating the first reference clock signal with at least one of an RC oscillator and a PLL (Phase Locked Loop) oscillator; and generating the second reference clock signal with a crystal oscillator.

13. The method of measuring the time according to claim 9, wherein said first measurement step includes a third measurement step of measuring the clock period of the first reference clock signal within the specific cycle of the second reference clock signal, and a fourth measurement step of measuring the clock period of the first reference clock signal measured in the first measurement step to be compared with the expected measurement value thus compensated.

14. The method of measuring the time according to claim 9, further comprising a frequency dividing step of dividing a frequency of the second reference clock signal, wherein, in the first measurement step, said clock period of the first reference clock signal is measured within the specific cycle of the second reference clock signal divided in the frequency dividing step.

15. The method of measuring the time according to claim 9, further comprising a reference clock selection step of selecting one of the first reference clock signal and the second reference clock signal as a system clock, wherein, in the first measurement step, a clock period of the system clock selected in the reference clock selection step is measured.

16. A time measurement device comprising:

a first measurement unit configured to measure a clock period of a first reference clock signal within a specific cycle of a second reference clock signal;

a calculation unit configured to calculate a physical amount indicating a variance amount of the clock period measured with the first measurement unit;

a compensation unit configured to compensate an expected measurement value indicating the clock period of the first reference clock signal corresponding to a time as a measurement target according to the physical amount calculated with the calculation unit; and a first interruption unit configured to output a first interruption signal per cycle of the second reference clock signal;

a second interruption unit configured to output a second interruption signal after the clock period of the first reference clock signal measured with the first measurement unit reaches the expected measurement value thus compensated;

a second measurement unit configured to measure an overflow number count of an overflow that occurred when the first measurement unit measures the clock period of the first reference clock signal within the specific cycle of the second reference clock signal; and a third interruption unit configured to output a third interruption signal when the overflow occurs, wherein said calculation unit is configured to determine whether the first interruption signal is output for a first time after the first interruption unit outputs the first interruption signal, said calculation unit is configured to initialize a measurement value of the first measurement unit so that the calculation unit sets flag information indicating that a first interruption occurs after the first interruption signal is output for the first time, and said calculation unit is configured to retrieve a clock period of the first reference clock signal measured before as the clock number of the first reference clock signal within the specific cycle of the second reference clock signal so that the calculation unit initializes the flag information after the first interruption signal is not output for the first time, said calculation unit is configured to control the first measurement unit to start measuring the clock period of the first reference clock signal after the first interruption unit outputs the first interruption signal, and to wait for a next first interruption signal, said calculation unit is configured to retrieve the clock period of the first reference clock signal measured before as the clock period of the first reference clock signal within the specific cycle of the second reference clock signal after the first interruption unit outputs the next first interruption signal so that the calculation unit calculates a ratio between the clock period of the first reference clock signal measured before and the reference clock period as the physical amount, said compensation unit is configured to compensate the expected measurement value according to the ratio, said output unit is configured to control the first measurement unit to start measuring the clock period of the first reference clock signal measured with the first measurement unit after the compensation unit compensates the expected measurement value, and to wait until the second interruption unit outputs the second interruption signal, said output unit is configured to output the time information after the second interruption unit outputs the second interruption signal, said calculation unit is configured to calculate a product of the overflow number count of the overflow measured with the second measurement unit and a clock period that causes the overflow, said calculation unit is configured to calculate a sum of the product of the overflow number count of the overflow and a clock period of the first reference clock signal measured with the first measurement unit without the overflow, said calculation unit is configured to retrieve the sum as the clock period of the first reference clock signal within the specific cycle of the second reference clock signal, said second measurement unit is configured to measure the overflow number count of the overflow when the third interruption unit outputs the third interruption signal, said calculation unit is configured to initialize the measurement value of the first measurement unit and a measurement value of the second measurement unit so that the calculation unit sets the flag information indicating that the first interruption occurs when the calculation unit determines that the first interruption signal is output for the first time, said calculation unit is configured to retrieve the clock period of the first reference clock signal measured before and the overflow number count measured with the second measurement unit when the first interruption signal is not output for the first time, and said calculation unit is configured to calculate the product and the sum so that the calculation unit initializes the flag information.

* * * * *